Figure 1:
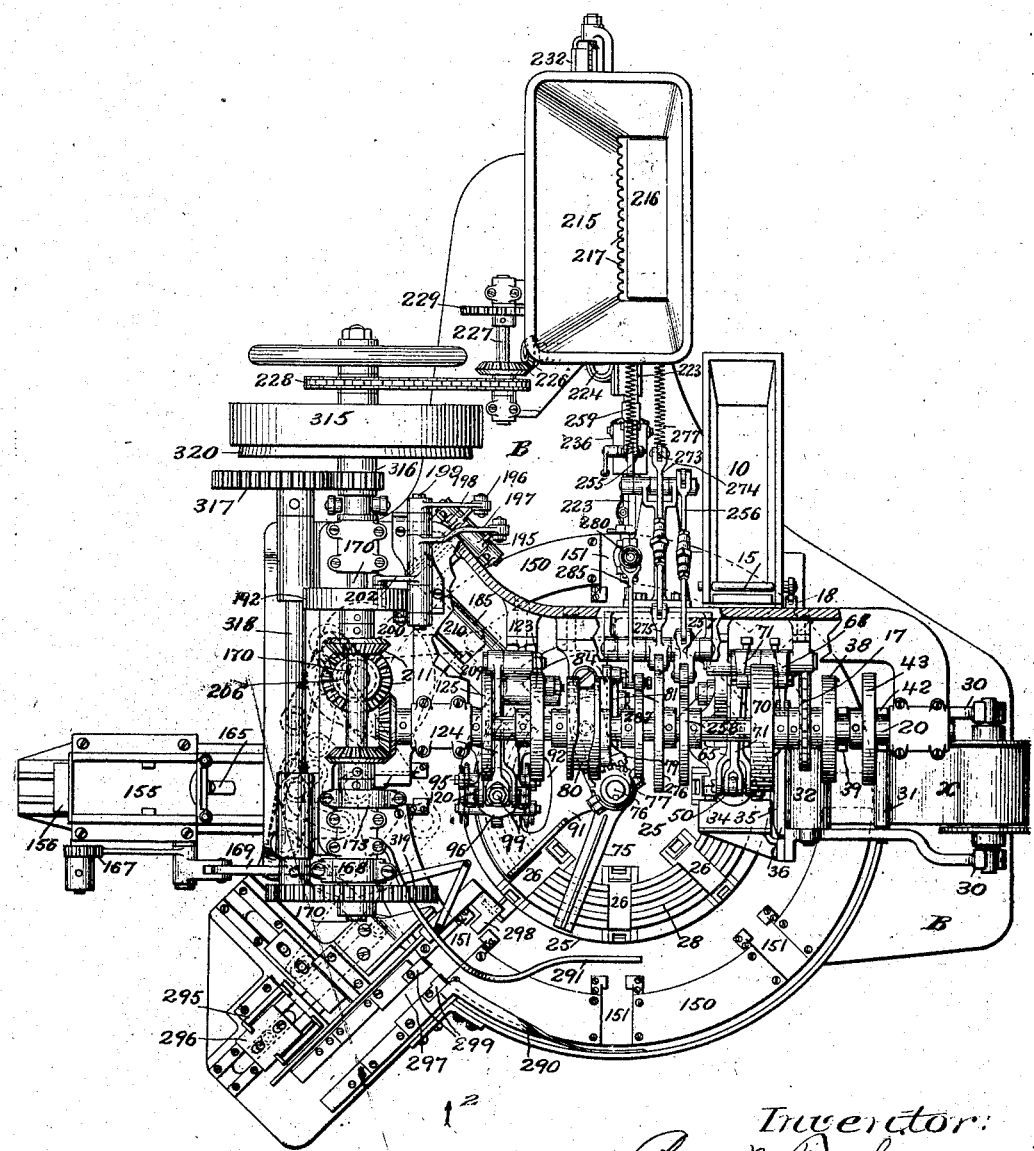

B. W. TUCKER.
PACKING MACHINE.
APPLICATION FILED SEPT. 30, 1902.

998,936.

Patented July 25, 1911.
23 SHEETS—SHEET 1.

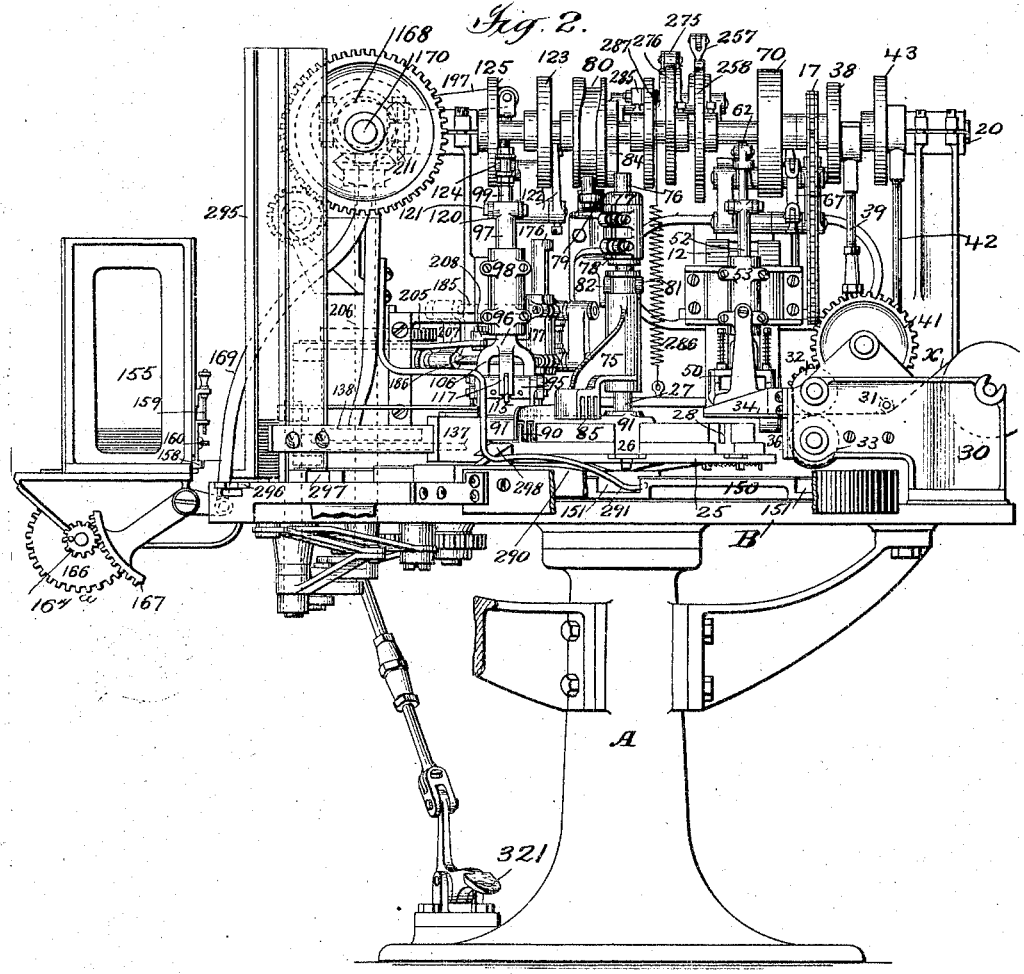

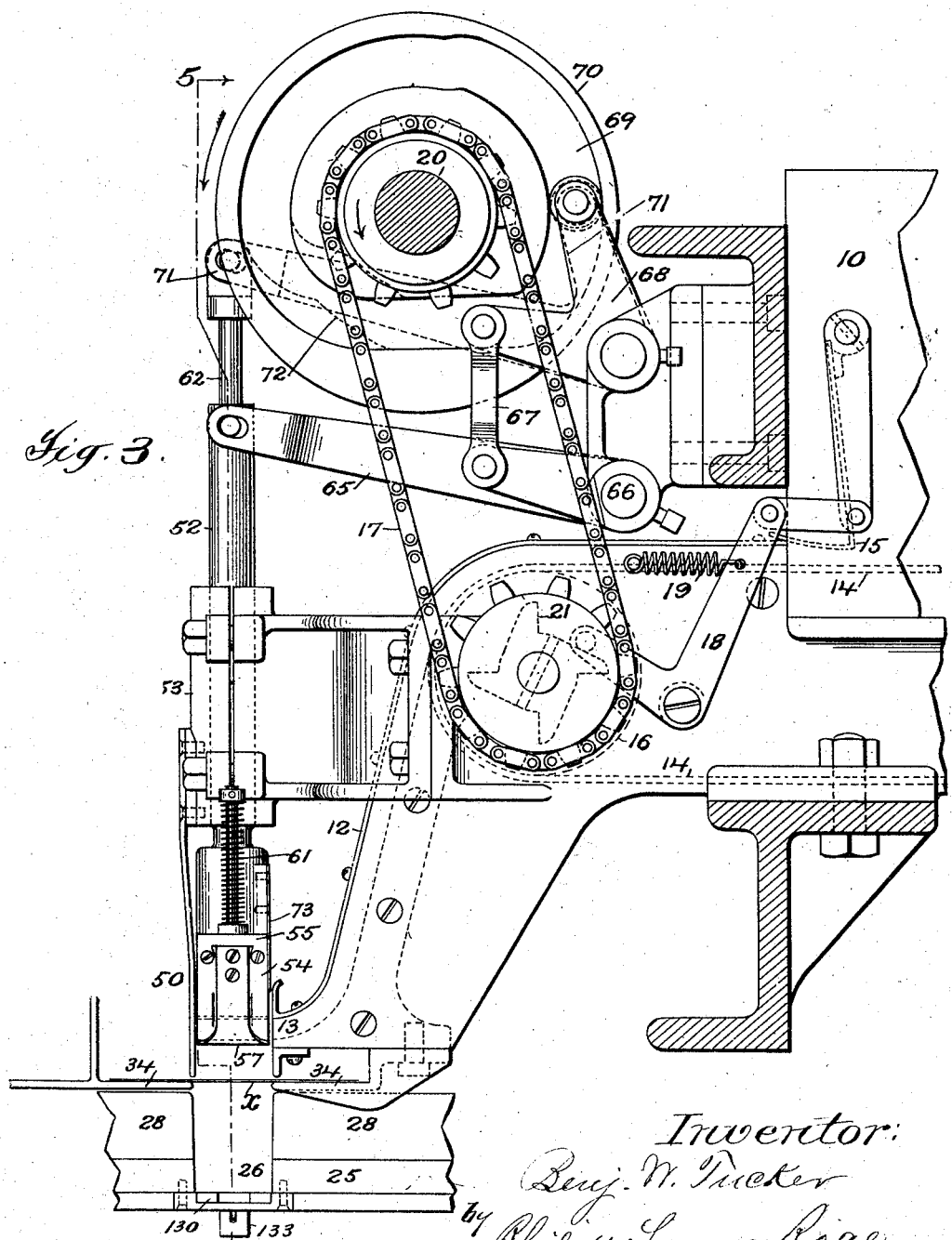

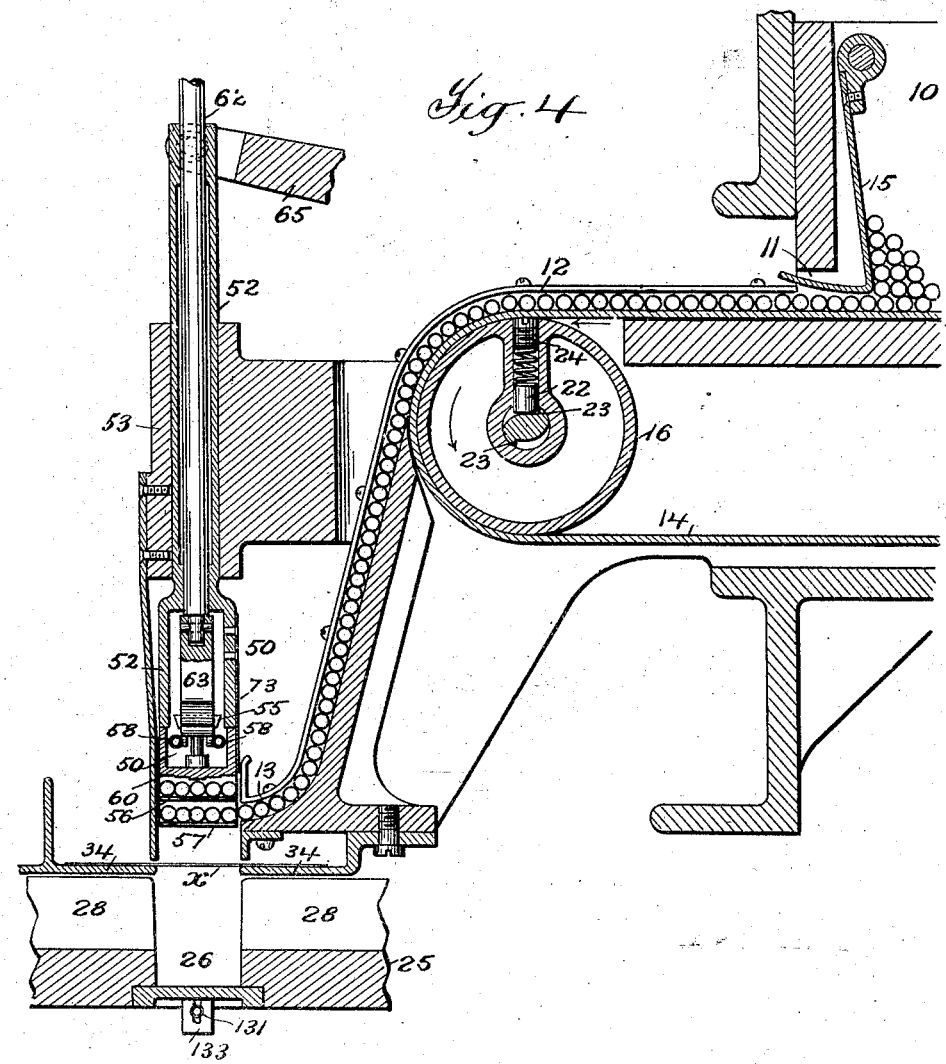

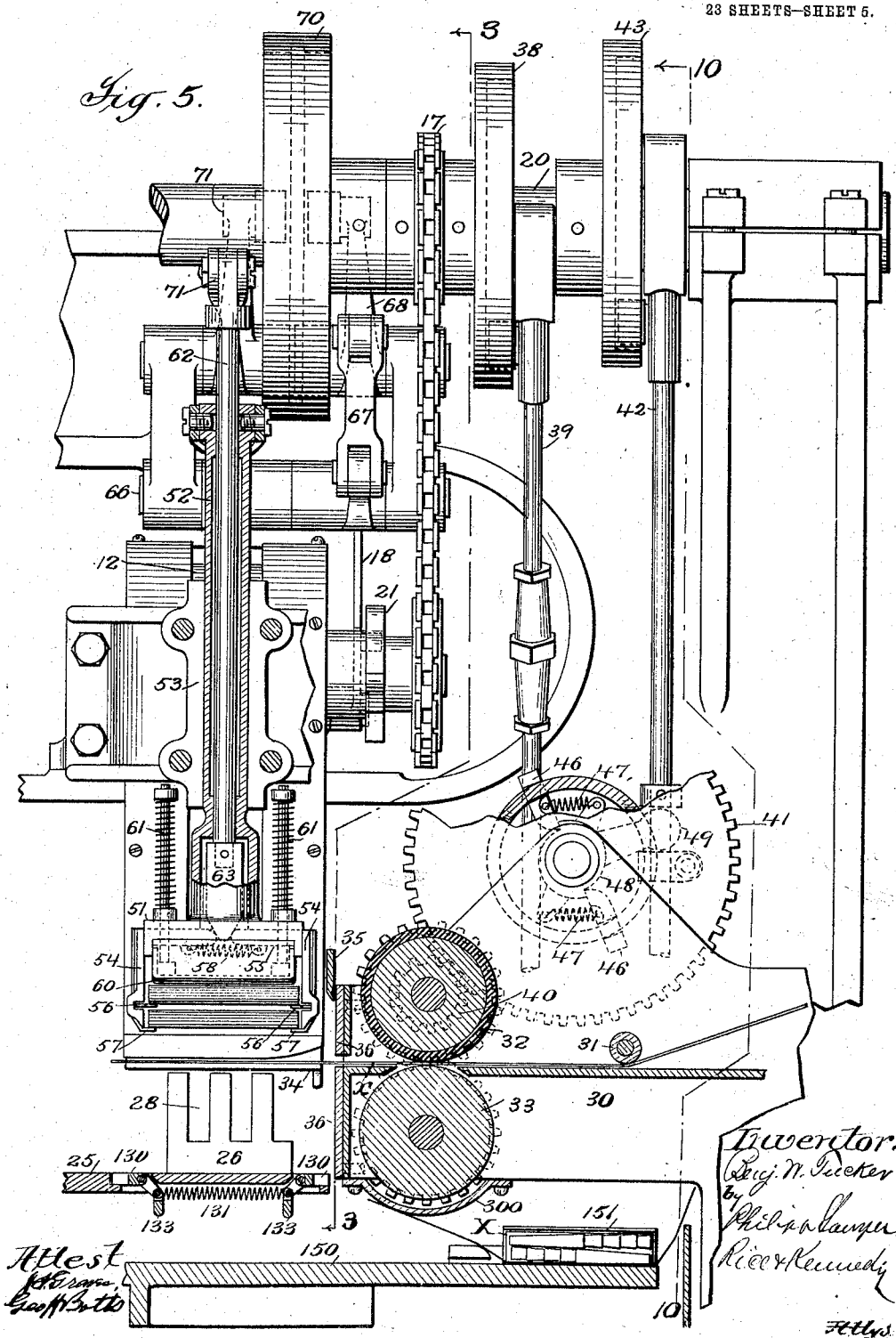

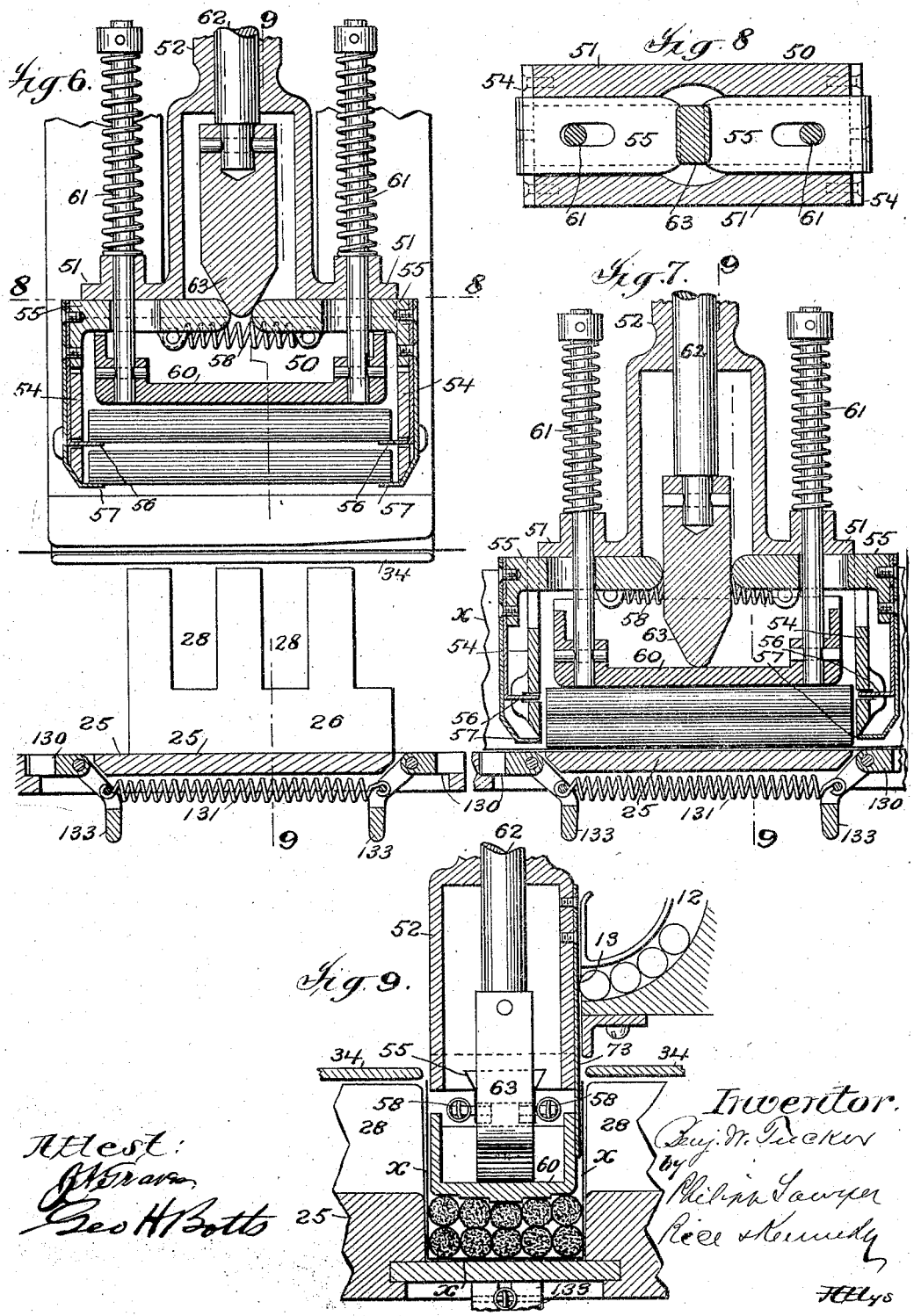

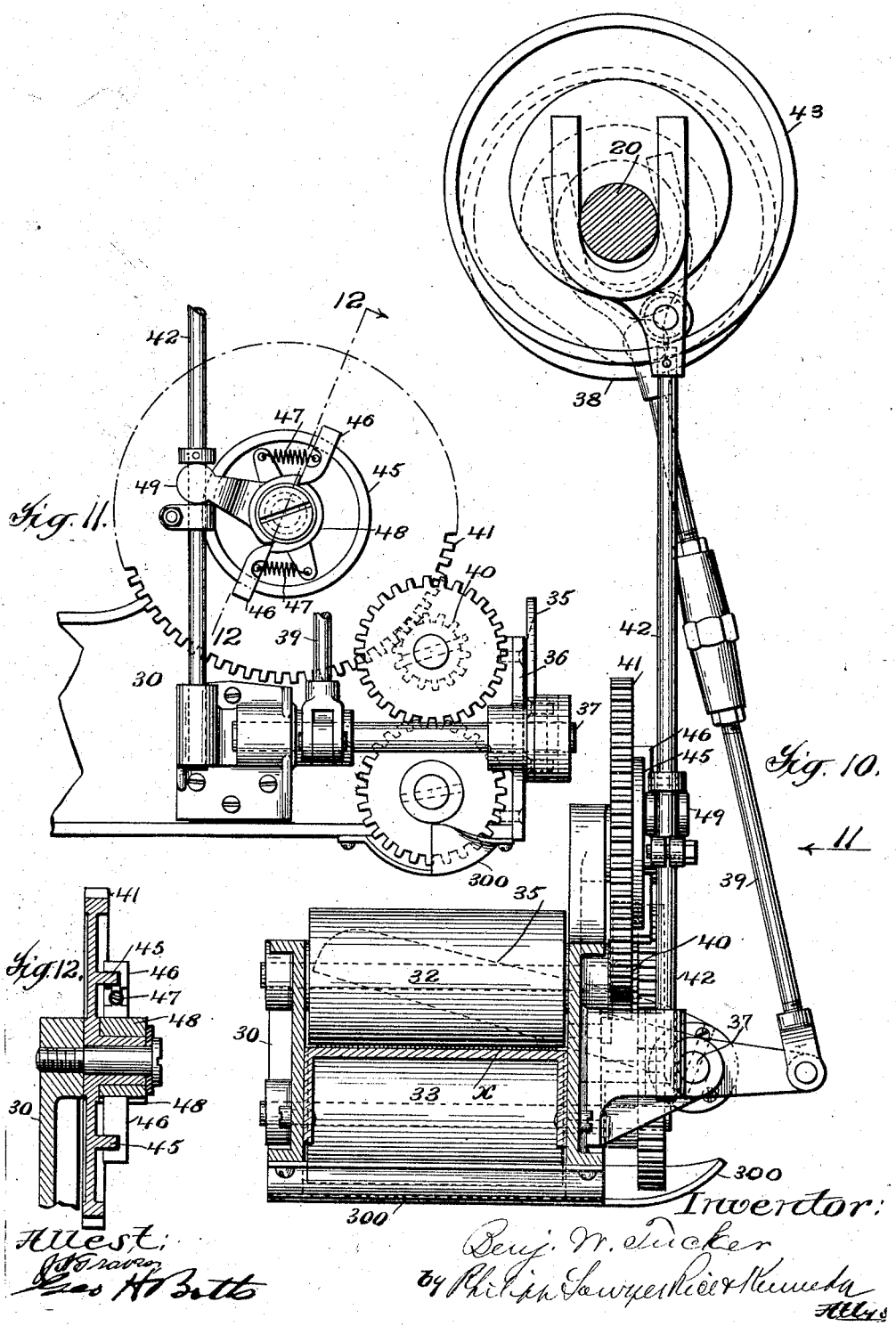

B. W. TUCKER.
PACKING MACHINE.
APPLICATION FILED SEPT. 30, 1902.
998,936.
Patented July 25, 1911.
23 SHEETS—SHEET 8.
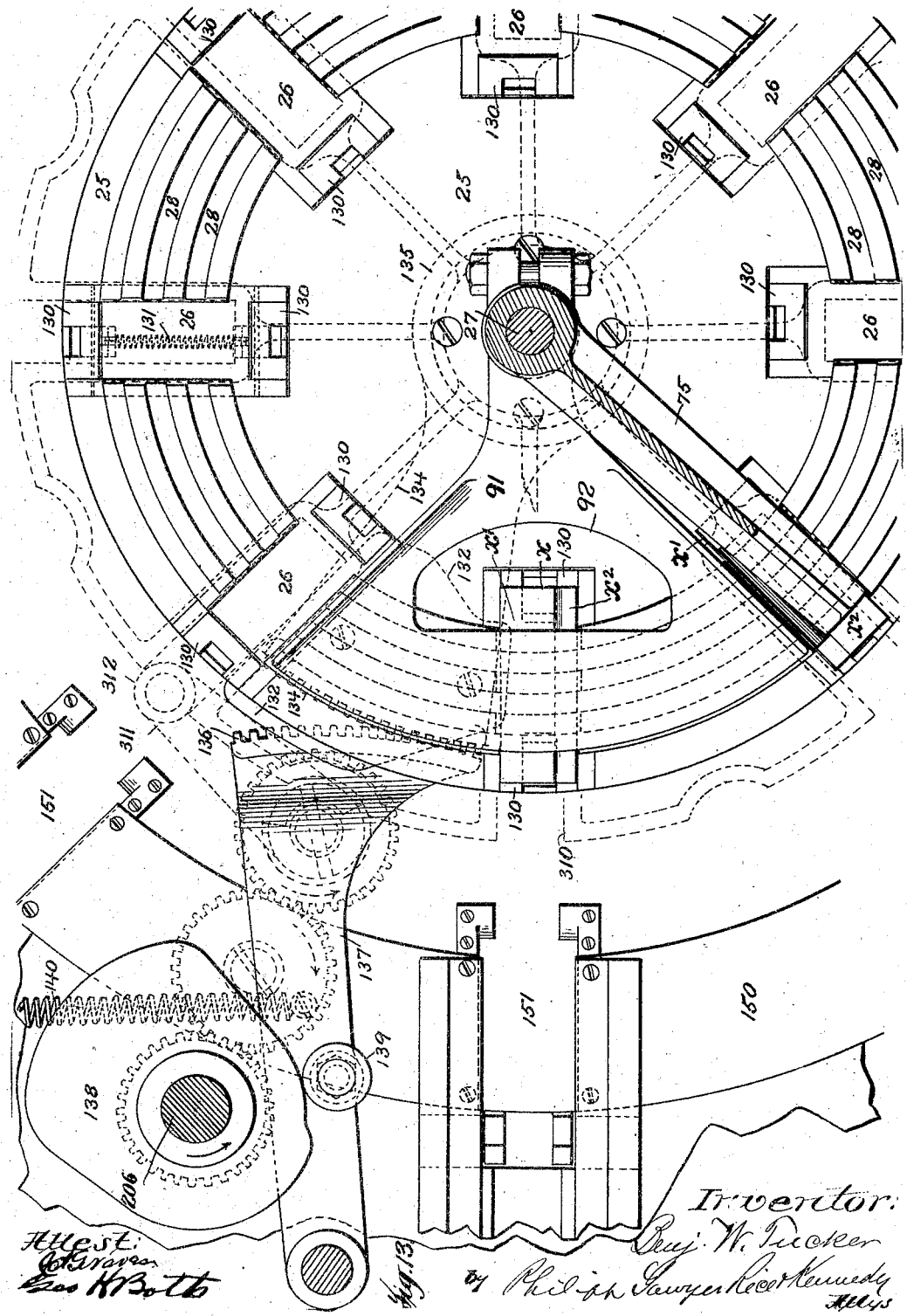

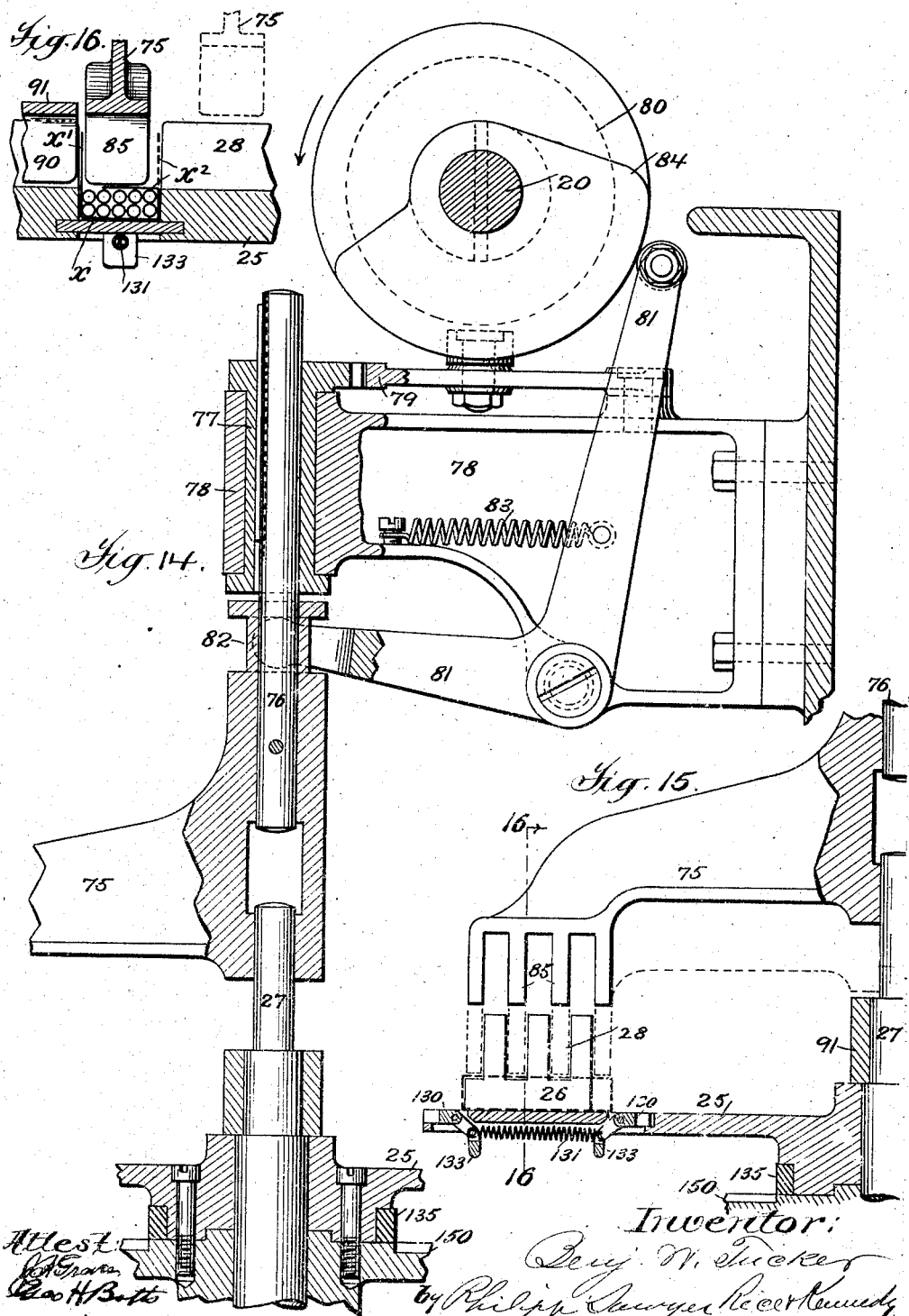

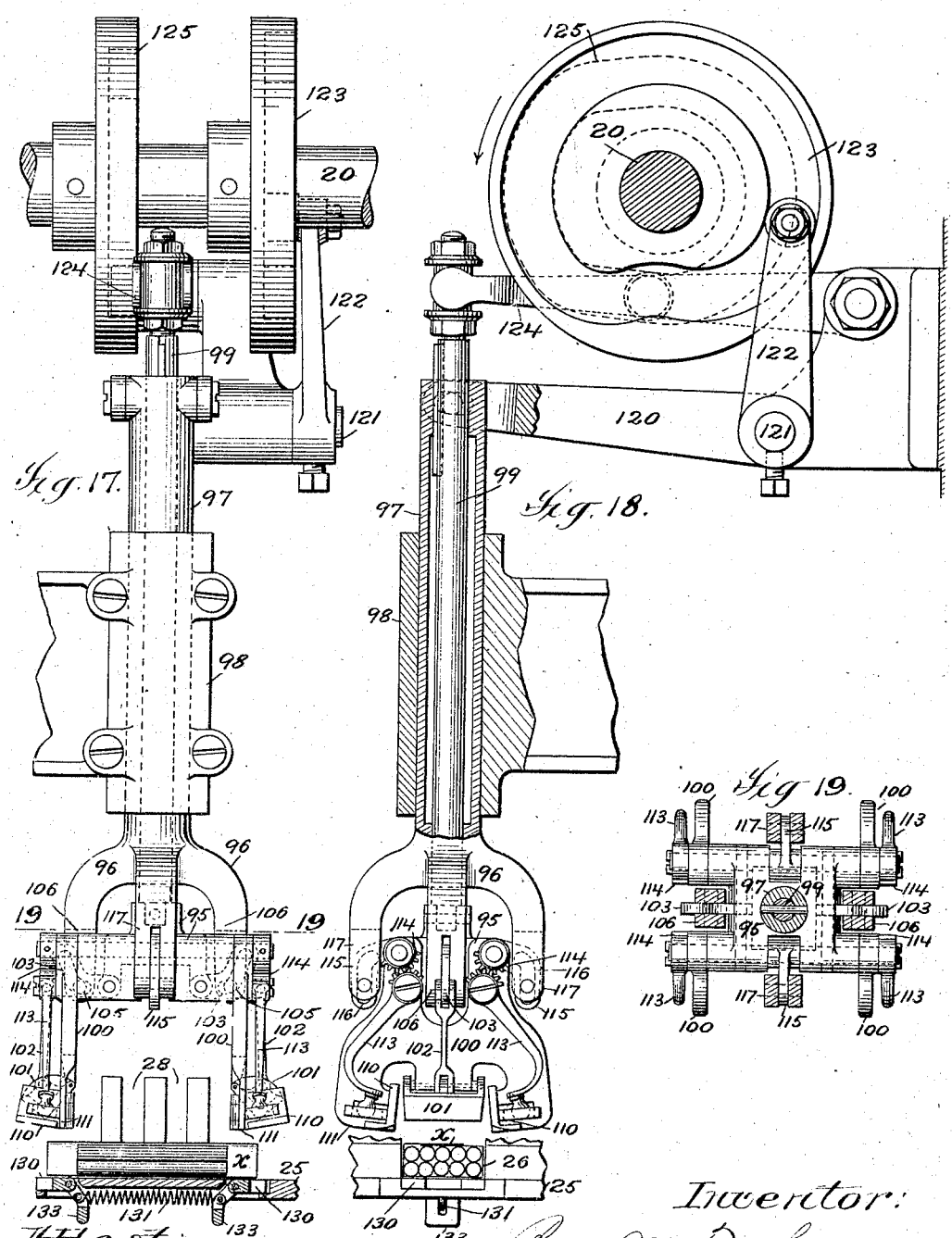

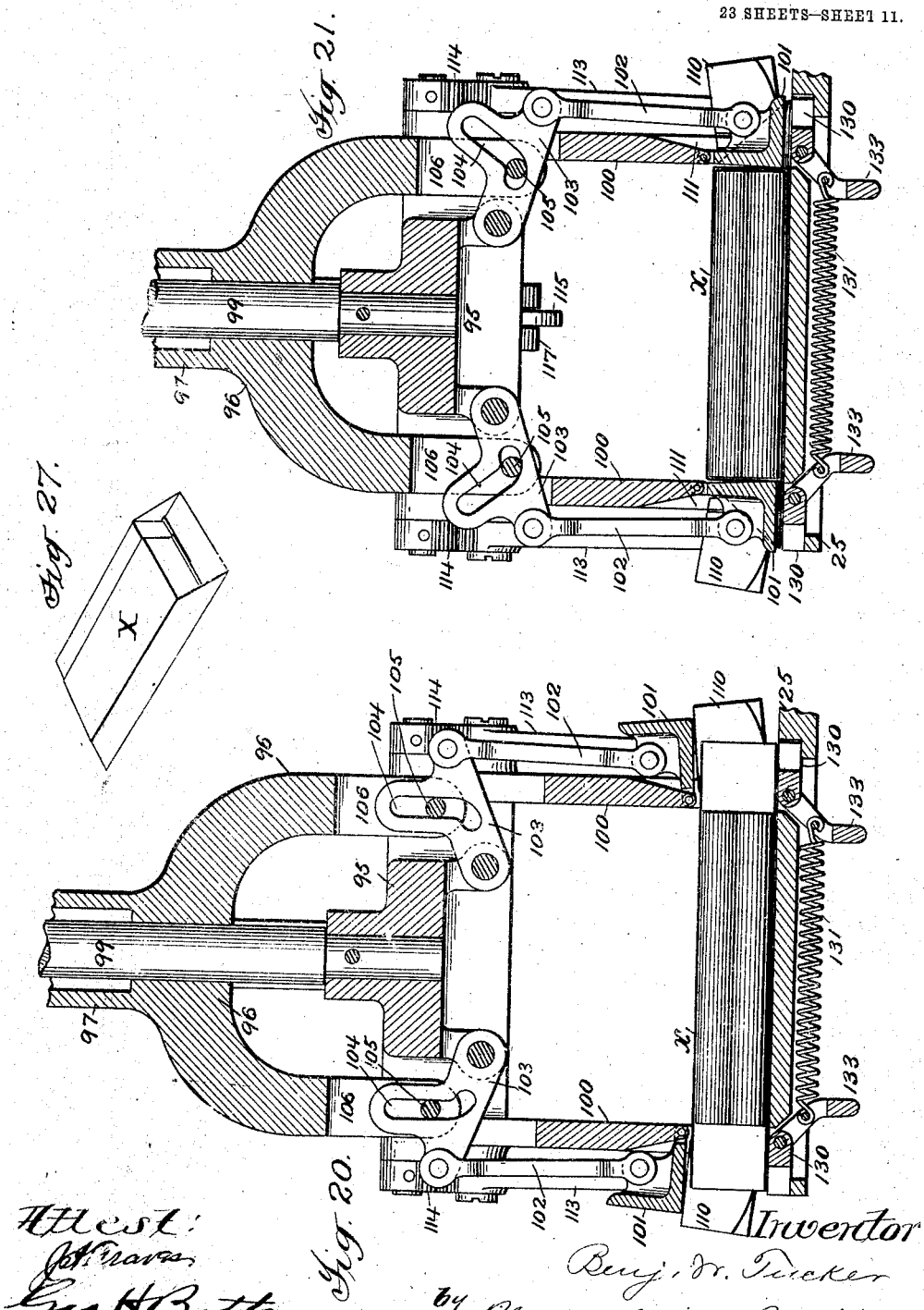

B. W. TUCKER.
PACKING MACHINE.
APPLICATION FILED SEPT. 30, 1902.
998,936.
Patented July 25, 1911.
23 SHEETS—SHEET 12.
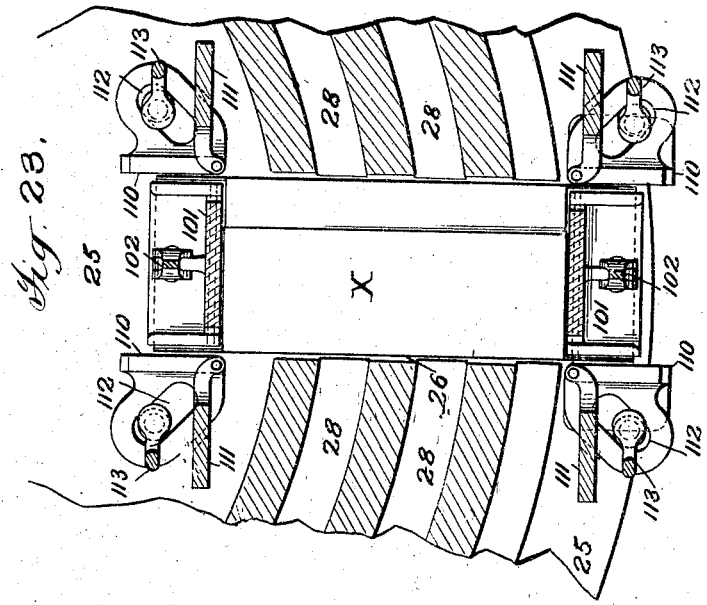
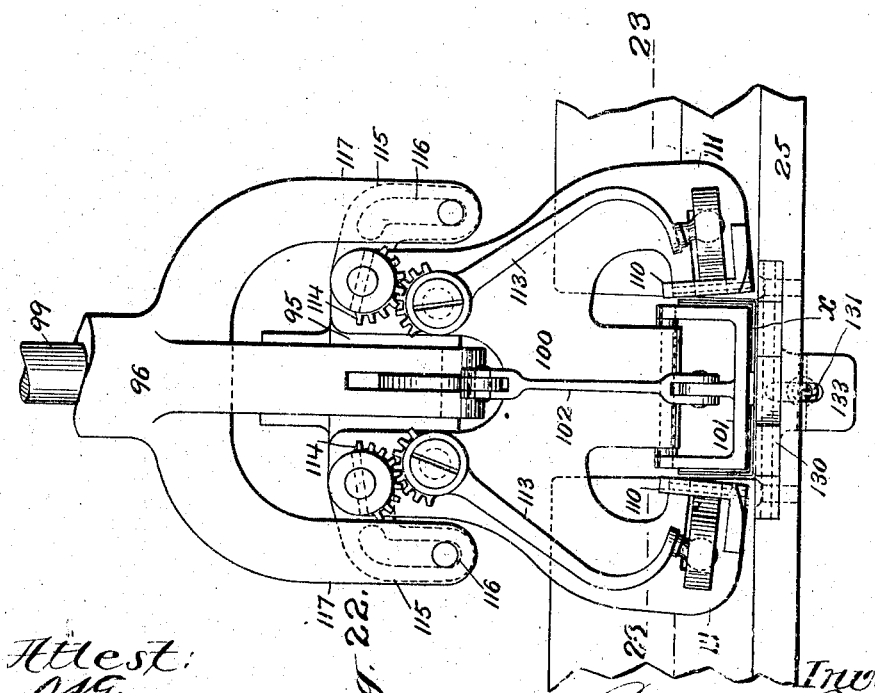

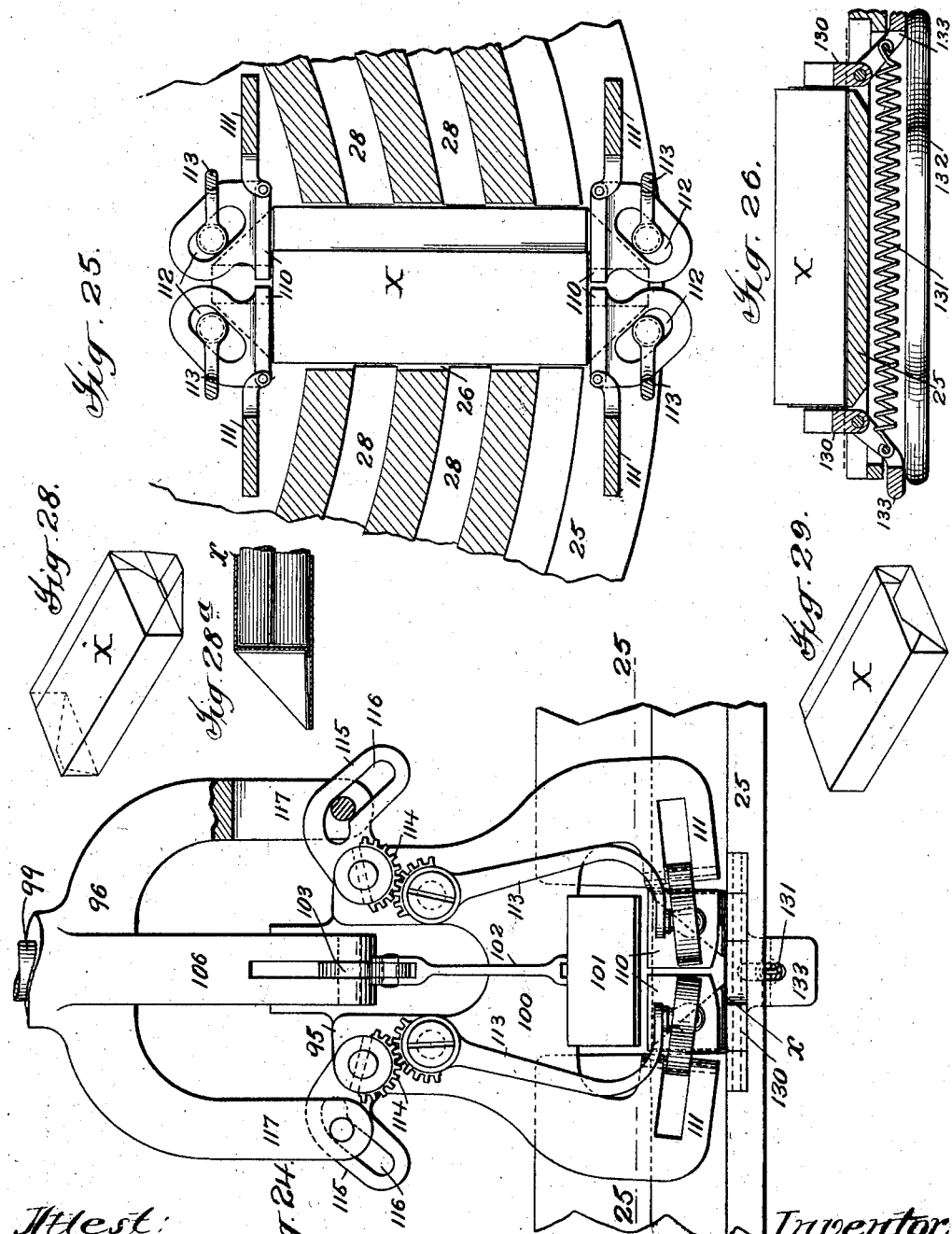

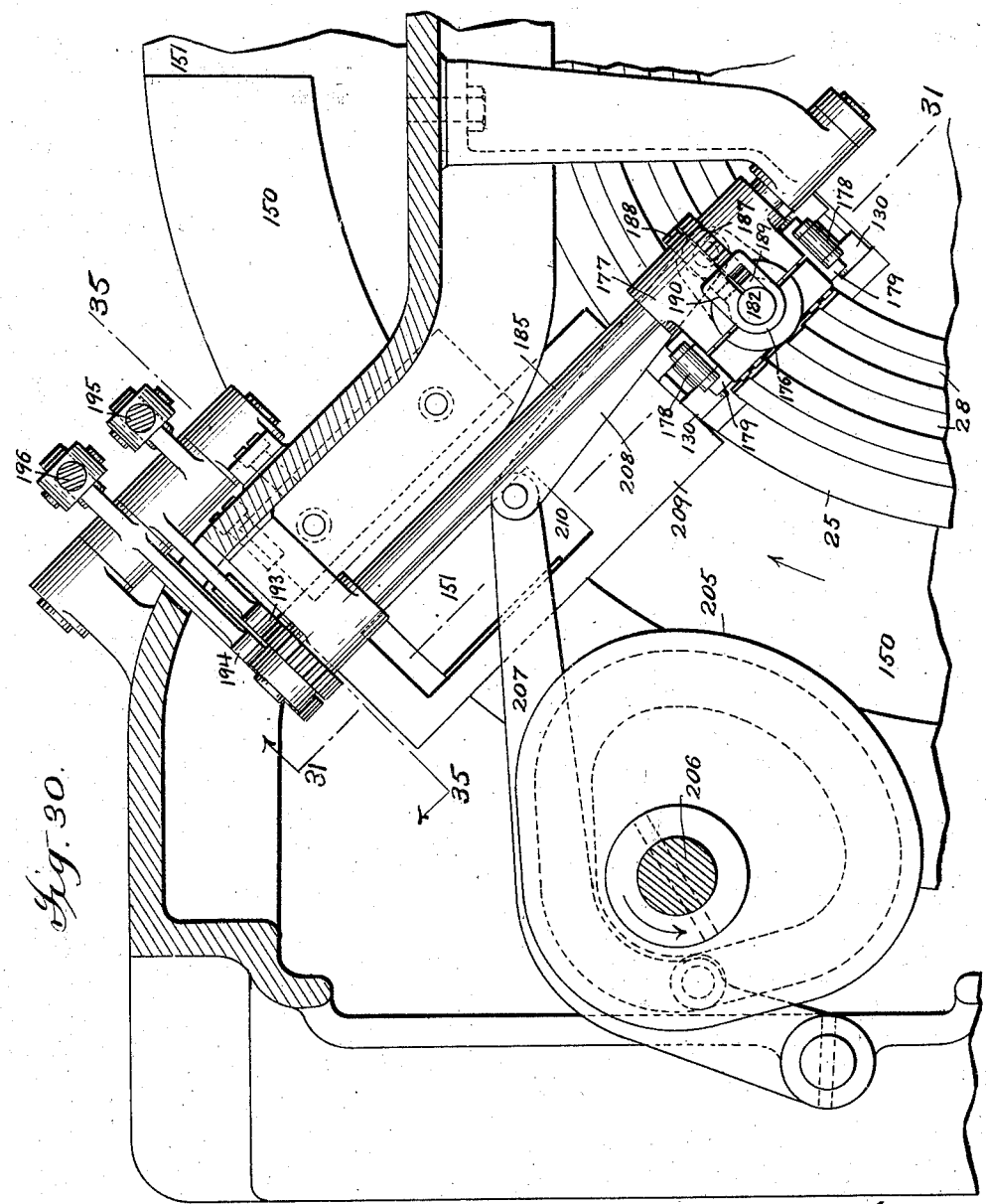

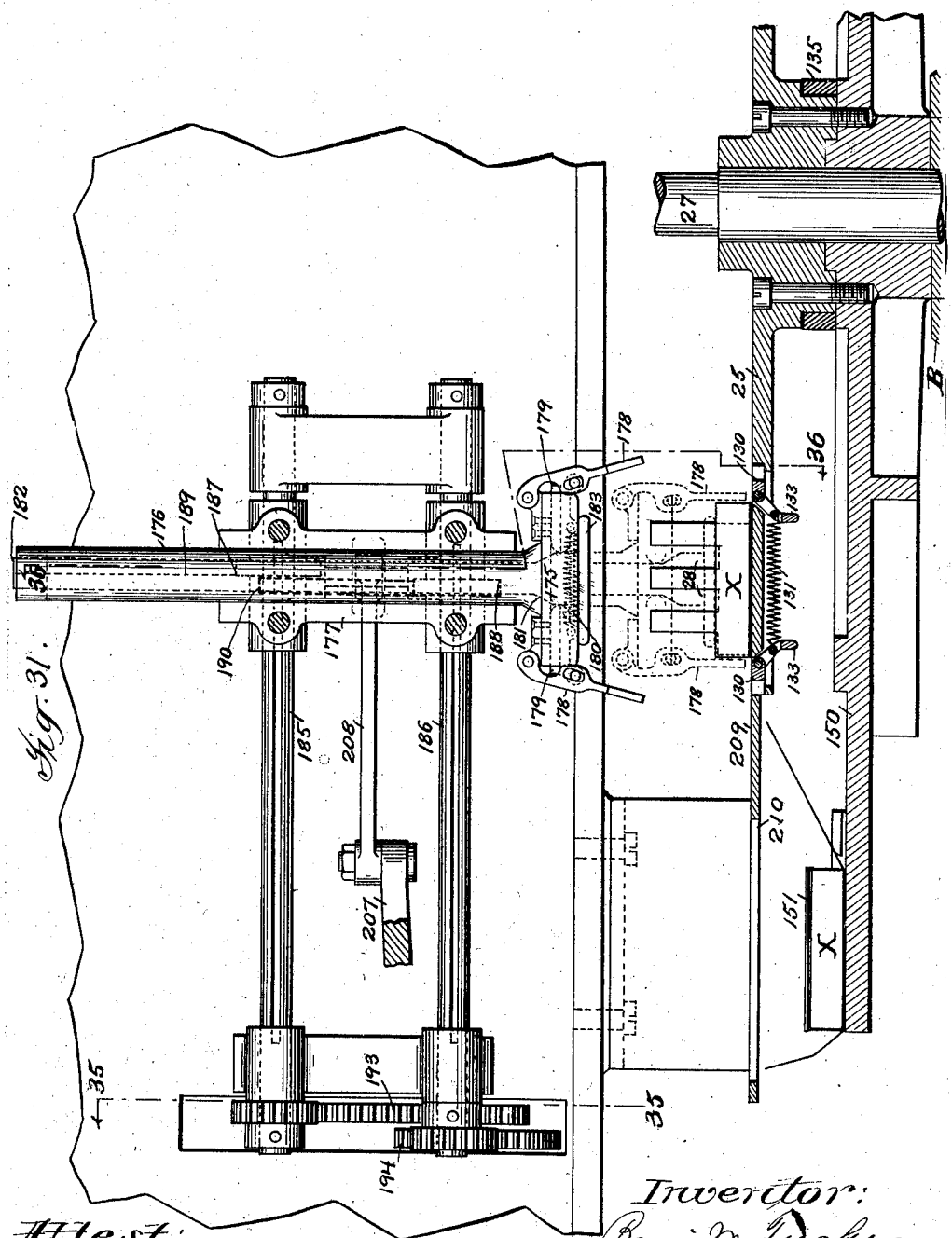

B. W. TUCKER.
PACKING MACHINE.
APPLICATION FILED SEPT. 30, 1902.
998,936.
Patented July 25, 1911.
23 SHEETS—SHEET 16.
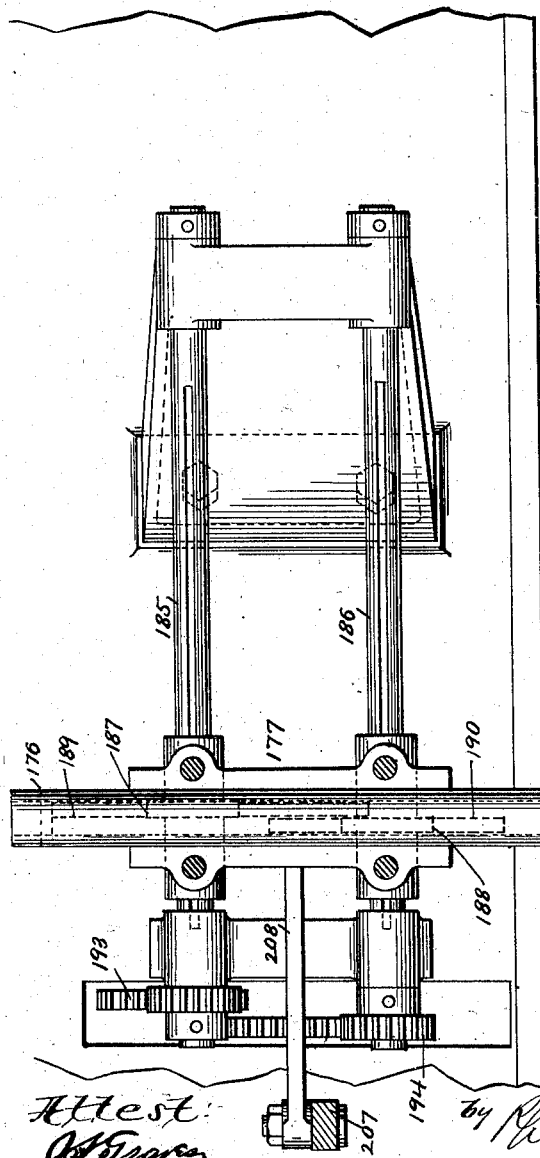
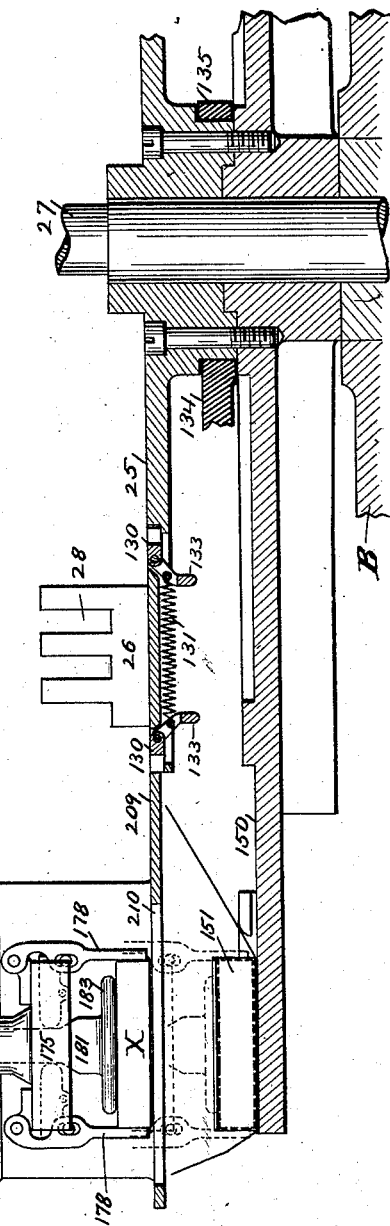

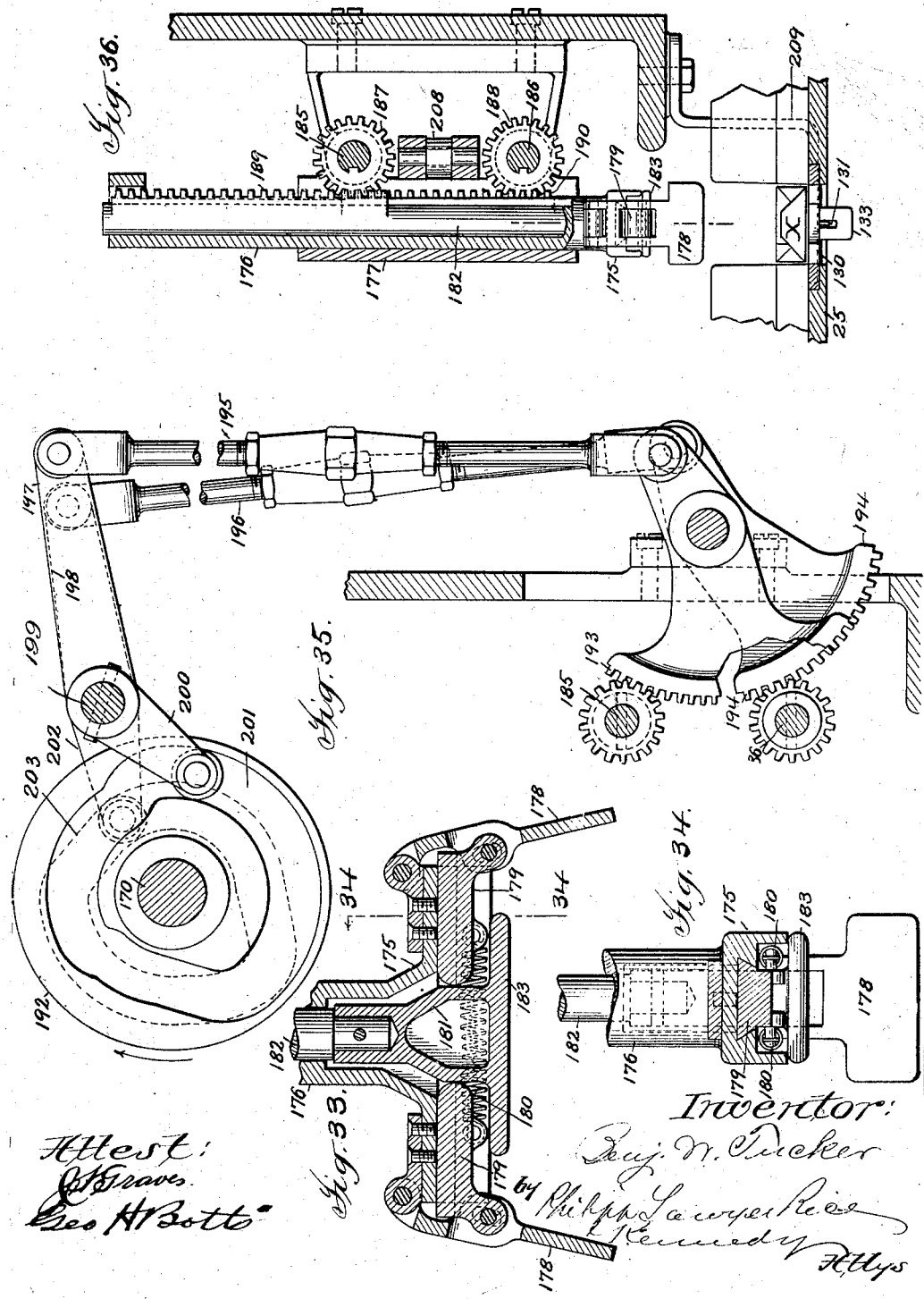

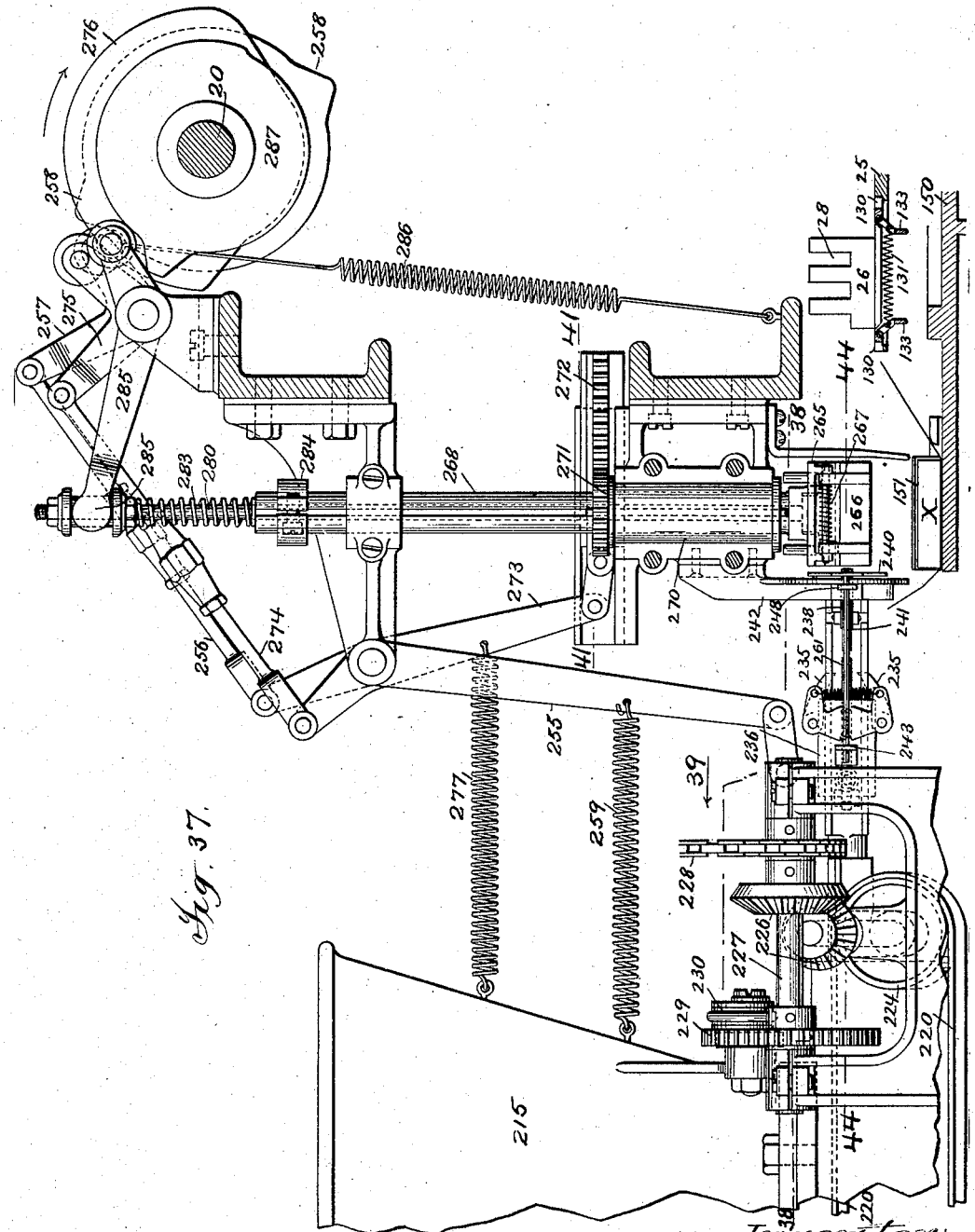

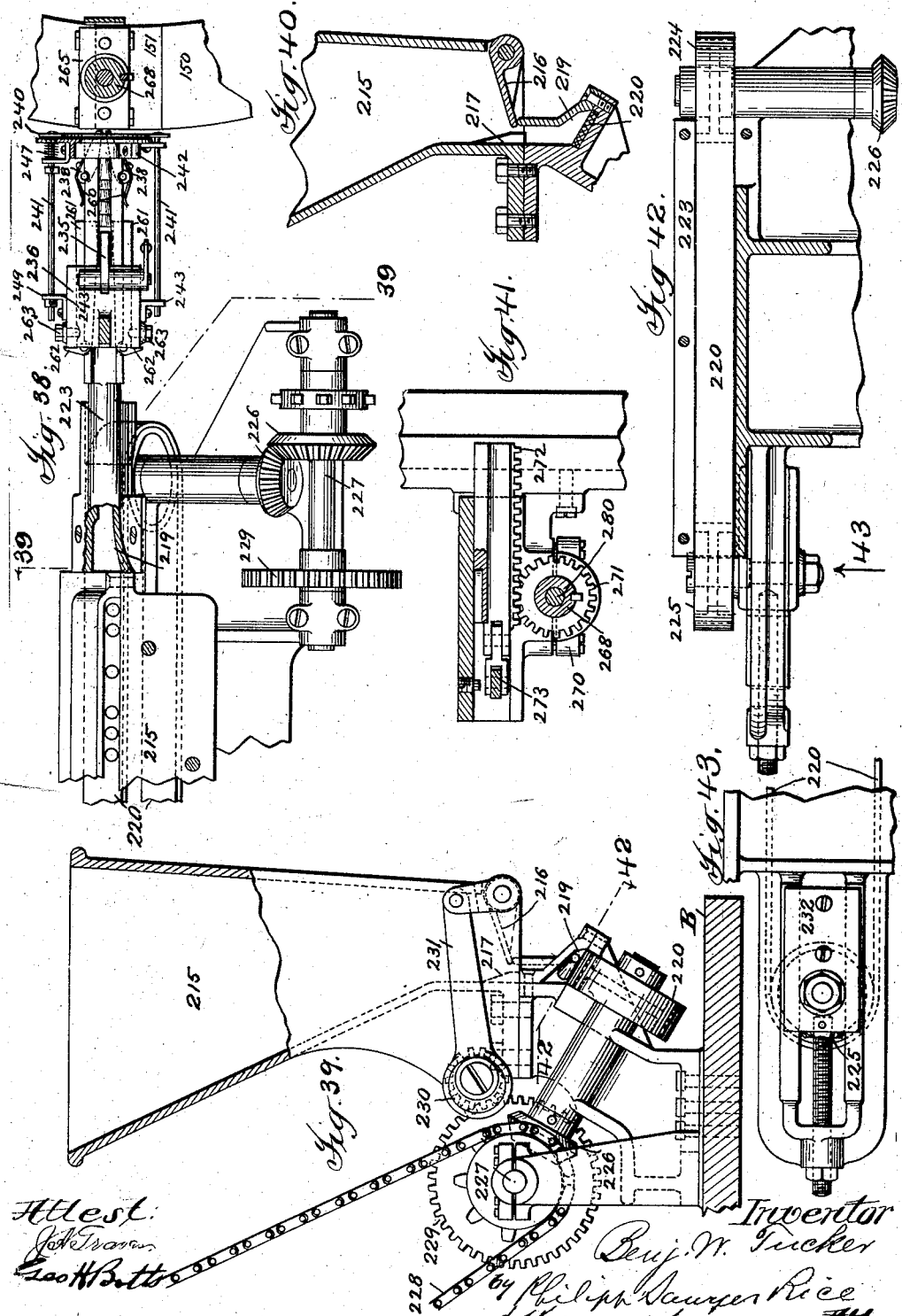

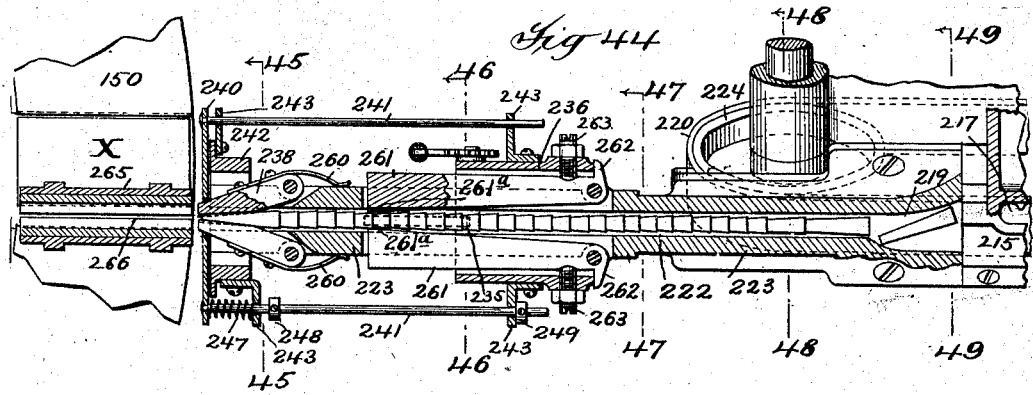

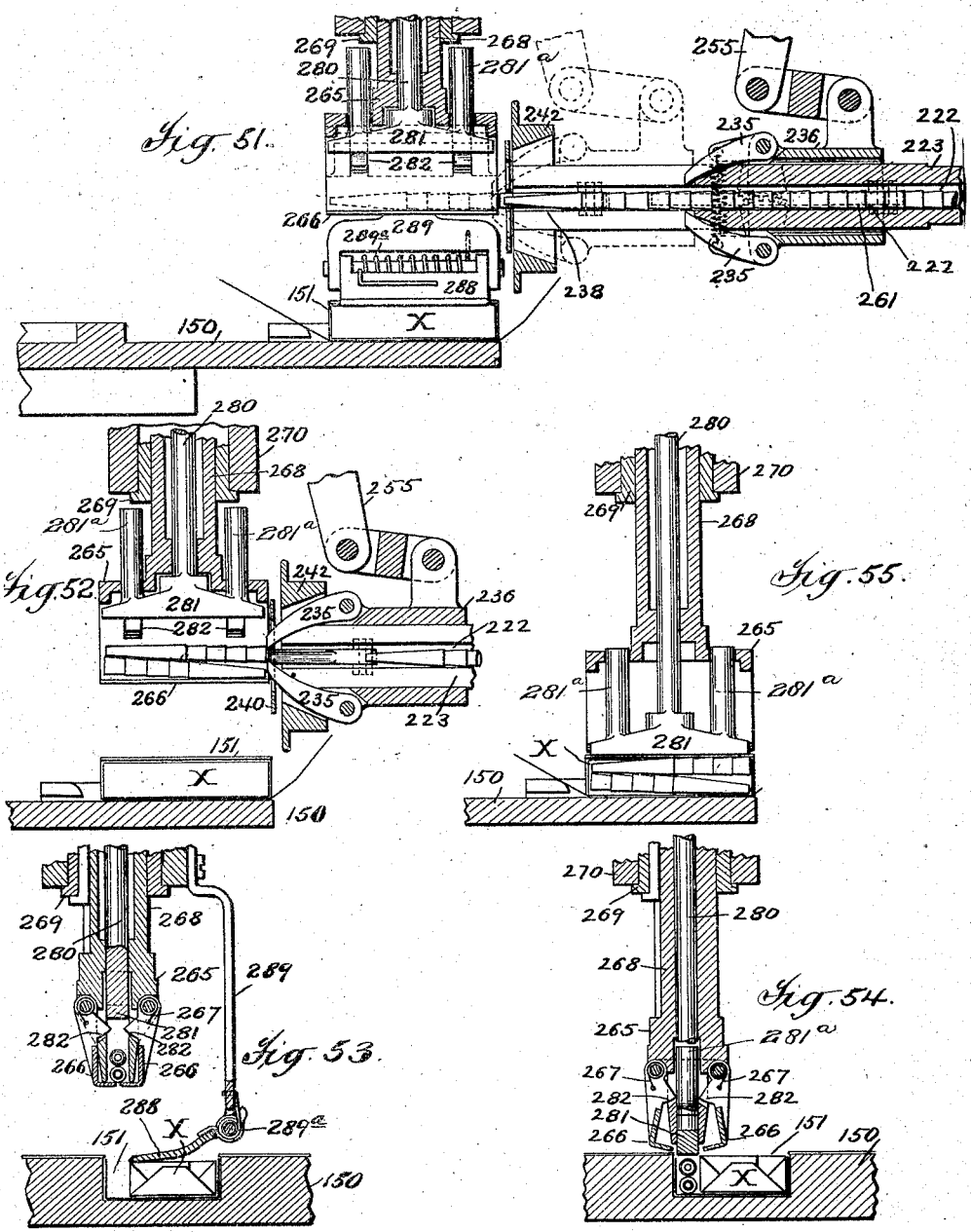

B. W. TUCKER.
PACKING MACHINE.
APPLICATION FILED SEPT. 30, 1902.
998,936.
Patented July 25, 1911.
23 SHEETS—SHEET 22.
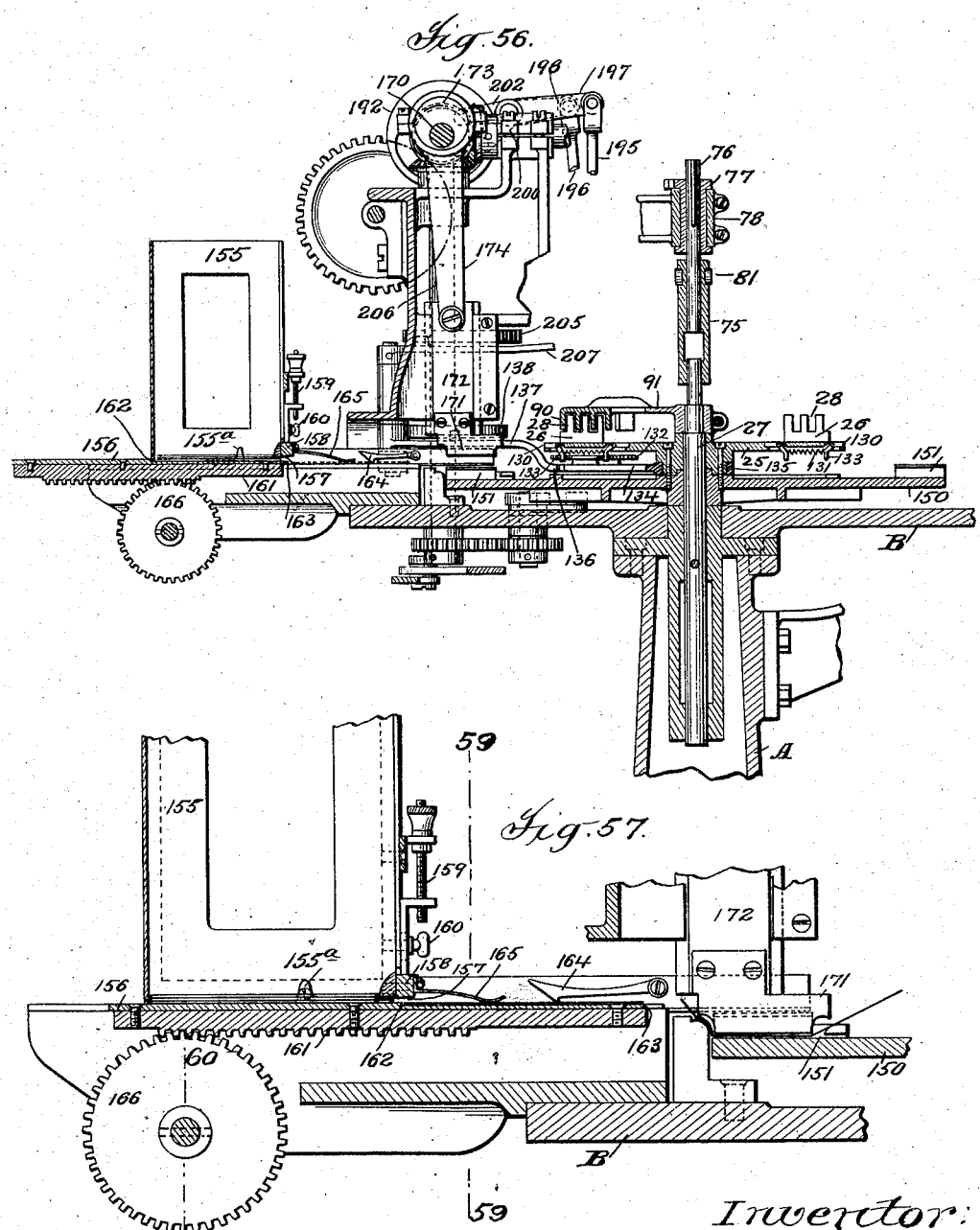
Attest:
J. F. Graves
Geo. H. Botz
Inventor:
Benj. W. Tucker
by Philipp Sawyer Rice
 Kennedy
Attys

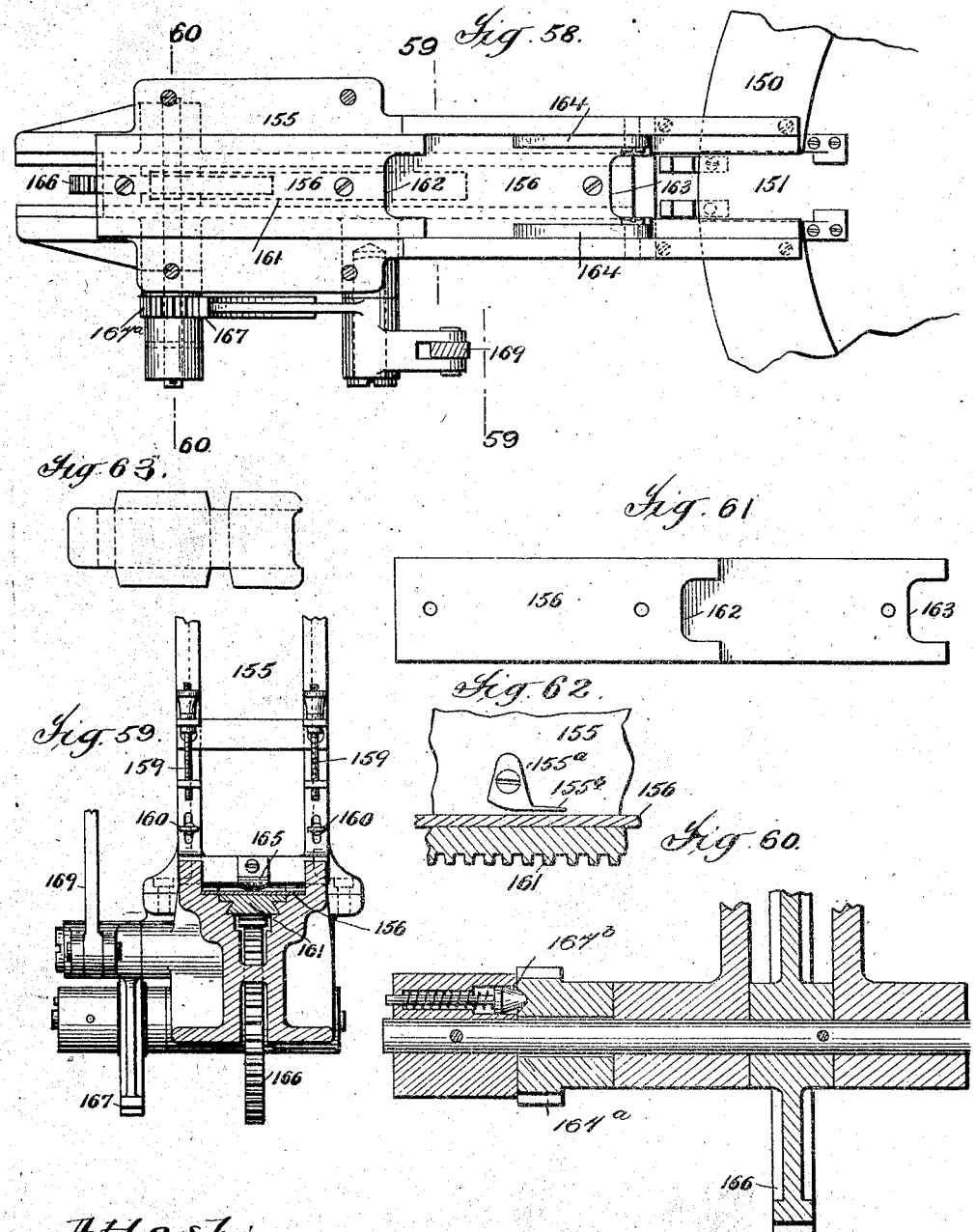

UNITED STATES PATENT OFFICE.

BENJAMIN W. TUCKER, OF NEWARK, NEW JERSEY, ASSIGNOR TO THE AMERICAN TOBACCO COMPANY, OF NEW YORK, N. Y., A CORPORATION OF NEW JERSEY.

PACKING-MACHINE.

998,936.   Specification of Letters Patent.   Patented July 25, 1911.

Application filed September 30, 1902. Serial No. 125,419.

*To all whom it may concern:*

Be it known that I, BENJAMIN W. TUCKER, a citizen of the United States, residing at Newark, county of Essex, and State of New Jersey, have invented certain new and useful Improvements in Packing-Machines, fully described and represented in the following specification and the accompanying drawings, forming a part of the same.

This invention relates to packing machines, and more particularly to machines for packing cigarettes or similar articles in boxes.

One of the special objects of the invention is to provide a machine whereby a row or rows of cigarette tips or holders will be packed in the box with the cigarettes.

Another object of the invention is to provide for wrapping the charge of cigarettes in a suitable wrapper, such as tin or other metal foil, to form a package which is then deposited in the box.

The invention also aims to improve the general construction of machines of this class.

With these and other objects in view, the invention includes various features relating to the counting and feeding of the cigarettes or other articles, associating the charges of cigarettes with the wrapper sheets, folding the wrapper sheet about the charge of cigarettes, presenting the boxes for receiving the wrapped package of cigarettes, depositing the packages of cigarettes in boxes, nesting conical cigarette tips or holders, advancing the nested holders and counting and depositing charges of the desired number in the boxes and for completing the folding of the box; and includes also features relating to the general construction and arrangement of an organized machine.

As a full understanding of the invention can best be given by a detailed description of a machine embodying all the features thereof in their preferred form, such a description will now be given in connection with the accompanying drawings showing such a machine.

In said drawings:—Figure 1 is a plan view of an organized machine embodying the various features of the invention. Fig. 2 is an elevation, partly broken away, looking in the direction of the arrow 2 in Fig. 1. Fig. 3 is an enlarged view partly in section on line 3 of Fig. 5, showing the cigarette feeding and depositing mechanism in elevation. Fig. 4 is a sectional view of the cigarette feeding and depositing mechanism. Fig. 5 is a section, taken on line 5 of Fig. 3, and also showing the wrapper sheet feeding mechanism. Fig. 6 is a sectional view, on a still larger scale, of the cigarette depositing plunger and the receiving pocket. Fig. 7 is a similar view showing the depositing plunger in delivering position. Fig. 8 is a section on line 8 of Fig. 6. Fig. 9 is a section on line 9 of Figs. 6 and 7. Fig. 10 is a section on line 10 of Fig. 5, showing the wrapper sheet feeding mechanism. Fig. 11 is a view looking in the direction of the arrow 11 of Fig. 10. Fig. 12 is a section on line 12 of Fig. 11. Fig. 13 is a detail plan view, on the scale of Fig. 3, showing part of the wrapping carrier and parts coöperating therewith for performing a part of the wrapping operation and showing also the operation of the boxing carrier. Fig. 14 is a sectional elevation of the mechanism for operating the arm for folding down one of the upwardly extending sides of the wrapper. Fig. 15 is a detail view, partly in section, showing said wrapper folding arm. Fig. 16 is a section on line 16 of Fig. 15. Fig. 17 is an elevation of the folding plunger carrying the folders for folding the ends of the wrapper, and showing the means for operating said plunger. Fig. 18 is a view of the part shown in Fig. 17 taken at right angles thereto and partly in section. Fig. 19 is a section on line 19 of Fig. 17. Fig. 20 is an enlarged sectional view of the folding plunger, viewing the same sidewise of the package. Fig. 21 is a similar view showing the parts in a different position. Fig. 22 is an elevation of the folding plunger, viewing the same endwise of the package. Fig. 23 is a section on line 23 of Fig. 22. Fig. 24 is a view similar to Fig. 22, but showing the parts in a different position. Fig. 25 is a section on line 25 of Fig. 24. Fig. 26 is a detail sectional view, showing the folders for making the last of the ends fold in their upturned position and showing the cam whereby such folders are operated. Figs. 27 and 28 are perspective views of the package with its ends partially folded. Fig. 28ª is a detail section through one end of the package. Fig. 29 is a perspective view of the package after the completion of the folding of the ends. Fig. 30 is a plan view of the transferring mechanism for transferring the package and depositing it in a partially folded box on the boxing carrier. Fig. 31 is a section taken on line 31 of Fig. 30. Fig. 32 is a view similar to Fig. 31, but showing the parts in a different position. Fig. 33 is an enlarged sectional view of the transferring plunger. Fig. 34 is a section taken on line 34 of Fig. 33. Fig. 35 is a section on line 35 of Fig. 30. Fig. 36 is a section on line 36 of Fig. 31. Fig. 37 is an elevation of the cigarette tip or holder feeding, counting and depositing mechanism. Fig. 38 is a plan view taken on line 38 of Fig. 37. Fig. 39 is a view looking in the direction of the arrow 39 of Fig. 37, and taken on line 39 of Fig. 38. Fig. 40 is a detail sectional view of the tip hopper and the feeding channel beneath the same. Fig. 41 is a section on line 41 of Fig. 37. Fig. 42 is a section on line 42 of Fig. 39. Fig. 43 is a detail view looking in the direction of the arrow 43 in Fig. 42, showing the pulley for supporting one end of the tip feeding belt and means for adjusting the same to adjust the tension of the belt. Fig. 44 is a section on line 44 of Fig. 37. Figs. 45, 46, 47, 48 and 49 are sections taken respectively, on lines 45, 46, 47, 48 and 49 of Fig. 44. Fig. 50 is a detail view of a part to be hereinafter described. Fig. 51 is a vertical sectional view, showing the tip depositing plunger and the means for feeding a predetermined quantity of tips therein. Fig. 52 is a similar view, showing the parts in a different position. Fig. 53 is a transverse vertical sectional view of the tip depositing plunger and showing a box with a package of cigarettes beneath the plunger in position to receive the tips therefrom. Fig. 54 is a view similar to Fig. 53, but showing the plunger in depositing position. Fig. 55 is a longitudinal sectional view showing the plunger in the position shown in Fig. 54. Fig. 56 is a vertical sectional view, on the scale of Figs. 1 and 2, showing the wrapping carrier and the boxing carrier and the box blank feeding devices and box forming die. Fig. 57 is a sectional view of the box blank feeding devices on a scale intermediate that of Figs. 1 and 2 and Fig. 3. Fig. 58 is a plan view of the box blank feeding devices with the blank holder removed. Fig. 59 is a section taken on line 59 of Figs. 57 and 58. Fig. 60 is a section on an enlarged scale taken on line 60 of Fig. 57. Fig. 61 is a detail plan view of the blank feeding slide. Fig. 62 is an enlarged detail view to be described. Fig. 63 shows a preferred form of box blank.

By the machine shown in the drawings, the cigarettes are fed in predetermined quantities to a wrapping carrier and there associated with wrapper sheets. The sheet is wrapped about the cigarettes and the ends folded to form a package which is then deposited on a partially formed box or box slide carried by a boxing carrier, the blank for forming the box having been fed to the boxing carrier and partially folded thereon. The tips or holders or mouthpieces are fed from a hopper and the desired number deposited in the partially folded box beside the package of cigarettes, and the folding of the box is completed and the folded box then inserted into a sheath or tubular cover or shuck and delivered from the machine. The general course of the cigarettes as they are fed from the cigarette hopper through the machine and finally delivered therefrom packed in the box with the holders or mouthpieces, will be followed in describing the machine.

The various parts of the machine are supported by a standard A and a table B mounted on the standard A. The cigarettes are fed from a hopper 10 through an opening 11 and through a way 12, a portion of which is inclined downwardly and has a curved delivery end or discharge mouth 13. The cigarettes are fed from the hopper to the inclined portion of the way 12 by means of a belt 14, the upper run of which passes through the bottom of the hopper and forms the bottom of the upper or horizontal portion of the way 12. The hopper is preferably provided with a vibrating separator 15 for preventing the cigarettes from becoming clogged and insuring the proper feeding of the cigarettes from the hopper by the belt 12. These parts are or may be substantially as shown in United States Patent No. 482,542, dated September 13, 1892.

The driving pulley 16 for the feeding belt 14 is driven by means of a sprocket chain 17 from a counter shaft 20, and the separator 15 is vibrated by means of a bell crank lever 18 rocked against the tension of a spring 19 by a spur wheel 21 on the shaft of the belt pulley 16. (See Fig. 3.) In order to permit the pulley 16 to slip if the cigarettes should become jammed in the way 12, it is preferably clutched to its shaft by means of a spring stud 22 mounted in a radial opening in the pulley and adapted to be engaged by shoulder 23 on the shaft, as shown in Fig. 4. The tension of the spring bearing on the spring stud 22 may be varied by the adjusting screw 24 to permit the pulley to slip under any desired resistance to its movement.

The cigarettes are received from the way 12 by a carrier by which they are delivered to a pocket or form in a carrier which will be termed the "form carrier" or the "wrapping carrier," since the cigarettes are enveloped in the wrapper sheet while supported by this carrier. The wrapping carrier may be of any suitable construction, but is preferably a rotating carrier 25, provided with a plurality of radially arranged pockets or forms 26, and is mounted on a vertical spindle 27 carried by the standard A and is given a step by step rotary movement, each movement corresponding to the distance between adjacent pockets. The pockets 26 are preferably formed with open ends and with side walls of a suitable height for the purpose of holding up the sides of the wrapper, and the said walls are preferably formed with vertical cuts or grooves 28 extending downward preferably to a distance from the bottom of the pocket slightly less than the thickness of the package of cigarettes, these openings 28 being for the purpose of receiving correspondingly formed folders for folding down the upturned sides of the wrappers, as will be hereinafter described.

Before a charge of cigarettes is deposited in a pocket, a wrapper sheet $x$ is fed into position over the pocket so as to be carried down into the pocket with the cigarettes. Successive wrapper sheets may be fed to position over the pockets by any suitable mechanism. Preferably, however, sheet lengths are successively fed and cut from a web. For this purpose the roll of wrapping material, such as metal foil, is mounted on a reel in suitable supports 30, and the web is led from the reel under a guide roll 31 and thence between feeding rolls 32 and 33, which are given an intermittent feeding movement to advance a wrapper length of the material over a support 34, which support 34 is formed of two plates separated to leave an opening between their inner edges corresponding in width to the width of the pockets 26 and positioned so that such opening shall be directly above one of the positions of rest of the pockets 26. (See Figs. 3, 4 and 5.)

A wrapper length of the wrapping material having been fed into position over the support 34, is severed from the wrapper web by means of a swinging knife 35 (see Figs. 5, 10 and 11) which coöperates with a stationary knife plate 36. The knife 35 is mounted on a shaft 37 which is rocked for operating the knife by means of a face cam 38 on the shaft 20, acting through a rod 39 having a forked end guided by the shaft 20 and carrying a cam stud running in the groove of the cam 38 and having its other end connected to an arm on the rock shaft 37. The groove of the cam 38 is formed to give the knife 35 a cutting movement once for each revolution of the shaft 20.

The feeding rolls 32 and 33 may be operated in any suitable manner. As shown (see Figs. 5, 10, 11 and 12) the two rolls are geared together and the shaft of the roll 32 carries a pinion 40 which meshes with a gear 41 on a disk which is given an intermittent rotation by means of a reciprocating rod 42 which is reciprocated by means of a face cam 43 on the shaft 20, the rod being provided with a cam stud running in the groove of the cam 43 and being guided at its upper end by means of a fork embracing the shaft 20. For the purpose of causing the gear 41 to be given an intermittent rotation in one direction from the reriprocations of the rod 42, the gear is provided with a flange 45 on which are set clutch pawls 46 connected by springs 47 to a collar 48 mounted to rotate concentrically with, but independently of, the gear 41 and having their inner ends engaging notches in the collar 48. The collar 48 carries an arm 49 which is engaged by collars on the rod 42, the lower one of which collars is adjustable for varying the feed. By this construction, the collar 48 will be rocked back and forth by the reciprocations of the rod 42 and the pawls 46 will grip the flange 45 and rotate the gear 41 in the direction of the arrow in Fig. 11, as the collar 48 rotates in one direction, but will slip on the flange 45 as the collar rotates in the other direction. This form of clutch is well-known and is shown merely as a suitable form for securing the desired movement of the gear 41.

The carrier for receiving the cigarettes from the way 12 and depositing them in the pockets 26 may be of any suitable construction. Preferably, and as shown (see Figs. 3 to 9), it is formed by a depositing plunger 50. The machine shown is constructed to pack the cigarettes in the boxes in two layers of five cigarettes each and the depositing plunger is preferably formed to receive the two layers of cigarettes forming a charge, and then to descend to deposit the two layers of cigarettes at once in one of the pockets 26.

As shown, and as preferred, the depositing plunger comprises a head 51 carried by a hollow plunger stem 52 mounted to reciprocate vertically in a guide 53 and having downward extensions 54 which form the ends of the cigarette receiving chamber. The head 51 carries horizontally moving slides 55 which carry downwardly extending plates having their lower ends turned inward to form supports 56 and 57. The slides 55 are normally drawn inward toward each other by means of springs 58 and when in their normal inward position, as shown in Fig. 6, the supports 56 and 57 extend inward beyond the inner face of the ends 54, in position to extend beneath the ends of cigarettes when the latter are fed between the ends 54. The supports 56 and 57 are spaced vertically a distance apart slightly greater than the thickness of a cigarette, so that the plunger will support two rows of cigarettes arranged one close above the other. The plunger head also preferably carries a presser plate 60 mounted on spring rods 61 and normally held by the springs in its upper position, as shown in Fig. 6. For the purpose of moving the slides 55 for withdrawing the supports 56 and 57, and for operating the presser plate 60, a second plunger stem 62 is mounted to reciprocate vertically within the plunger stem 52. This plunger stem 62 carries a plunger head 63 having its lower end formed wedge shape to engage the slides 55 and thereby force them outward as the plunger head 63 moves downward relatively to the plunger head 51.

In the operation of the machine, after the depositing plunger has deposited a charge of cigarettes, it is moved upward opposite the delivery end of the way 12 with the supports 56 in position to receive a layer of cigarettes therefrom. The cigarettes will then be fed by gravity down the way 12 until five have been received on the supports 56, and further movement of the cigarettes is then prevented. The depositing plunger next moves upward far enough to bring the space above the supports 57 opposite the delivery opening of the way 12 to receive the second layer of five cigarettes. After the two layers of cigarettes have been received by the plunger, the plunger is moved downward to carry the cigarettes into the pocket 26 which is then beneath the plunger, the two stems 52 and 62 at first moving together so as to maintain the supports 56 and 57 in their inner position. As the plunger head 51 reaches its lowermost position, the plunger stem 62 is given a further movement to cause the head 63 to force the slides 55 apart and withdraw the supports from beneath the ends of the cigarettes, and also to engage the presser plate 60 and force it slightly downward to insure the delivery of the cigarettes and their even packing. The plunger stem 52 then begins to rise, the stem 62 remaining at first in its lowermost position to hold the supports retracted and to retain the presser plate in its pressing position, for the purpose of giving a set to the cigarettes. Then the stem 62 also begins to rise and the depositing plunger is brought back into position to receive the first layer of another charge of cigarettes.

The plunger stems 52 and 62 may be reciprocated by any suitable means, but, as shown, the stem 52 is reciprocated by means of a lever 65 mounted on a rock shaft 66, which carries an arm connected by a link 67 with one arm of a bell crank lever 68, the other arm of which carries a cam stud running in a cam groove 69 in a double faced cam disk 70 on the shaft 20; and the plunger stem 62 is reciprocated by means of a bell crank lever 71, one arm of which has a connection with the stem 62, and the other arm of which carries a cam stud running in a cam groove 72 in the other face of the cam disk 70. The cam groove 72 is indicated in dotted lines in Fig. 3.

The plunger head 51 is preferably provided with a guard plate 73 on the side thereof next to the end of the way 12 adapted to bridge the space between the lower edge of the side of the plunger head 51 and the upper edge of the side of the presser plate 60, as clearly shown in Fig. 9, and thereby prevent the last cigarette in the way 12 from being injured by the passage of said space.

A wrapper sheet having been positioned on the support 34, as the plunger descends with a charge of cigarettes, the wrapper sheet will be carried downward with its central portion beneath the cigarettes and its sides bent upward about the cigarettes and the plunger, as indicated in Fig. 9.

The under or pressing face of the presser plate 60 is preferably formed transversely convex, that is, with its longitudinal central portion extending slightly below the portions which engage the adjacent cigarettes, and with the portions engaging such cigarettes slightly below the portions which engage the next or two outer cigarettes. The cigarettes as delivered into the pockets 26 will thus have the inner rows compressed slightly more than the outer rows, thereby overcoming the tendency of the cigarettes to arch upward, and securing a better set of the charge of cigarettes, and lessening the liability of the cigarettes becoming displaced within the pocket during the succeeding movements of the wrapping carrier. The face of the presser plate is preferably stepped, as clearly shown in Fig. 9. This feature is of especial advantage in connection with the feature of maintaining the presser plate in its pressing position for an appreciable time after the plunger head begins its upward movement, as before pointed out. After a charge of cigarettes has thus been deposited in one of the pockets 26 with the wrapper $x$ partially folded thereabout, the wrapping carrier 25 is moved forward a step to bring another pocket 26 into position to receive a charge of cigarettes and to carry the preceding charge toward the folding devices whereby the folding of the wrapper about the cigarettes is completed. Any suitable mechanisms may be employed for completing the folding of the wrapper, but the mechanisms shown are preferred and form a part of the invention.

Referring now especially to Figs. 1, 13, 14, 15 and 16, the upstanding sides of a wrapper sheet, which has been partially folded about a charge of cigarettes, as the latter were deposited in the pockets 26, are folded down over the top of the charge of cigarettes in the machine shown, by means of a stationary folder for folding the forward side $x'$, and a moving folder for folding down the rearward side $x^2$. The moving folder is preferably mounted to have a horizontally swinging movement concentric with the movement of the wrapping carrier, and a vertical movement for permitting it to clear the upturned sides of the wrappers as it moves backward. For this purpose, it is as shown, carried by a swinging arm 75 mounted on a spindle 76 which is splined to slide vertically in a sleeve 77 journaled in a bracket 78. The arm 75 is also preferably rotatably and slidably mounted on an upward extension of the spindle 27. The sleeve 77 is oscillated for swinging the arm 75 by means of a segment gear 79 which meshes with a gear on the sleeve 77 and carries a cam stud running in a peripheral cam groove 80; and the vertical reciprocations are given to the arm 75 by means of a bell-crank lever 81, one arm of which has a forked end running in a groove 82 on the neck of the arm 75, and the other arm of which carries a cam roll held by a spring 83 in contact with a peripheral cam 84 on the shaft 20. The end of the arm 75 forming the folder is formed with downwardly extending plates or fingers 85 adapted to enter the grooves 28 in the blocks, the ends of which form the sides of the pockets 26.

The cams 80 and 84 are so formed that, the arm having been raised and swung backward to the position shown in Fig. 1 and in dotted lines in Fig. 16, it will be maintained in that position until the wrapping carrier has made a movement, and then the arm will move downward to project the plates 85 into the grooves 28, as indicated in dotted lines in Fig. 15, and will then be swung forwardly to the position shown in full lines in Fig. 16, thereby turning the upturned side $x^2$ of the wrapper sheet downward from the position indicated in dotted lines in Fig. 16, over the top of the cigarettes, as indicated in full lines in Fig. 16. The arm will then remain at rest to maintain the folding plates 85 in the position shown in full lines in Fig. 16, to retain the folded side of the wrapper in its folded position until the carrier starts on its next movement, after which the arm will be raised and swung backwardly to carry the folder to the position shown in dotted lines in Fig. 16, to allow the next pocket with its upturned wrapper sides to pass beneath it.

The forward side $x'$ of the wrapper is folded down over the side $x^2$ by means of a stationary folder positioned to engage the upstanding edge $x'$ as the pocket 26 moves from the position in which the edge $x^2$ has been folded down. This stationary folder is preferably formed by a series of folders or plates 90 projecting downwardly in the slots 28 and extending preferably from the position of rest of the pockets at which the sides $x'$ and $x^2$ are folded over the cigarettes, past the next position of rest of the pockets at which the ends of the wrapper sheet are folded and to the following position of rest of the pockets at which the folded package is taken from the wrapping carrier to be deposited in the box, these plates 90 being thus extended for the purpose of holding the sides $x'$ and $x^2$ in their folded positions during the next two movements of the wrapping carrier. The plates 90 are preferably stationary and may be supported in any suitable manner, as by means of a bracket 91 secured to the spindle 27. The bracket 91 is preferably in the form of a plate having a central opening 92, as shown in Fig. 13, for permitting the end folding devices to extend downward therethrough into operating position. After the upturned sides of the wrapper have been thus folded down over the cigarettes, the carrier continues its movement and the package is brought into the position of rest of the pockets at which the ends of the wrapper are folded to complete the formation of the package. Any suitable means may be employed for folding the ends of the package, but the means shown are preferred and form a part of the invention.

Referring especially to Figs. 1, 13 and 17 to 29, the mechanism for folding down the top portions of the extending ends of the wrappers and folding in the side portions of the extending ends of the wrappers, as shown, comprises a carrying plunger 95 and an operating plunger 96. The operating plunger is carried by a hollow plunger stem 97, which is mounted to reciprocate vertically in a suitable guide 98 and the carrying plunger 95 is carried by a plunger stem 99 mounted to reciprocate vertically within the plunger stem 97. The carrying plunger 95 has opposite downward extensions 100, to the lower ends of which are pivoted folders 101 which are normally held in their upturned or retracted position as shown in Fig. 20. For operating these folders, they are connected by links 102 to levers 103 pivoted to the carrying plunger 95 and formed with cam slots 104 through which pass pins 105 carried by arms 106 of the operating plunger 96. The lower ends of the slots 104 are formed so that when the operating plunger moves downward relatively to the carrying plunger the levers 103 will be swung downward to swing the folders 101 downward and inward to the position shown in Fig. 21, thereby folding the upper parts of the extending ends of the wrapper sheet downward and inward against the ends of the cigarettes. The upper portions of the slots 104 are extended upward in a direction to permit a considerable movement of the operating plunger with relation to the carrying plunger without affecting the position of the folders 101. The folders 101 are preferably formed with two faces at an angle to each other slightly less than a right angle, as shown, for the purpose of securing an even positioning of all parts of the ends of the wrapper and for properly forming a locking flange on the edge of the top end portions of the wrapper to be engaged by the bottoms of the side folds, as shown in Fig. 28ª, to hold the folded top end portions and thereby the folded sides forming the top covering of the package securely in place. The folders are preferably swung to carry their folding faces past the vertical, as shown in Fig. 21. These folders are preferably formed slightly tapering downward, as shown clearly in Figs. 18 and 22, to prevent interference with the side portions of the wrapper ends.

For folding inward the side portions of the extending ends of the wrapper, two pairs of folding wings 110 are provided pivoted to downward extensions 111 of the carrying plunger 95, the folding wings 110 of each pair carrying plates formed with oppositely inclined cam grooves 112, into which project cam studs on levers 113 pivoted to the carrying plunger and carrying gear segments, each of which meshes with a gear segment 114 carried by a lever 115 pivoted to the carrying plunger. The levers 115 are formed with cam grooves 116, through which pass pins on arms 117 of the operating plunger 96. The upper portions of the grooves 116 are formed so that when the operating plunger moves upward with relation to the carrying plunger, and with the pins in the upper portions of these grooves, the levers 115 will be swung upward, thereby swinging the levers 113 inward and carrying the folding wings 110 from the position shown in Figs. 22 and 23 to that shown in Figs. 24 and 25, thereby folding the side portions of the extending ends of the wrapper inward against the end of the package. The lower portions of the grooves 116 are extended in a direction such that after the folding wings 110 have been returned to their normal or outer position, as shown in Figs. 22 and 23, by a downward movement of the operating plunger with relation to the carrying plunger, the operating plunger may then make a considerable further downward movement with relation to the carrying plunger without producing any movement of these folding wings.

The carrying and operating plungers are normally held in a raised position so as to leave a clear way for the projecting ends of the wrapper as a pocket 26 containing a package comes into the position of rest beneath these folding devices. Any suitable means may be provided for giving the required movements to the plunger stems 97 and 99. As shown, the stem 97 is reciprocated by means of an arm 120 carried by a short shaft 121, to the other end of which is secured an arm 122 which carries a cam stud running in the groove of a face cam 123 on the shaft 20; and the plunger stem 99 is reciprocated by means of a lever arm 124 which carries a cam stud running in the groove of a face cam 125 also fast on the shaft 20. The cams 123 and 125 are formed to give the plunger stems the required movements to actuate the carrying and operating plungers as follows:—After a package has been brought into position to have the projecting ends of the wrapper folded, the plunger stems 97 and 99 are moved downward together to carry the carrying and operating plungers downward to the position as shown in Fig. 20. The stem 97 then continues its downward movement to move the operating plunger downward relatively to the carrying plunger and thereby cause the folders 101 to swing inward to the position shown in Fig. 21, folding the upper portions of the extending ends of the wrapper, as shown in Fig. 27. The operating plunger is then moved upward while the carrying plunger remains stationary and the folders 101 are swung back to their normal position, and the upward movement of the operating plunger continuing, the folding wings 110 are swung inward from the position shown in Figs. 22 and 23 to that shown in Figs. 24 and 25, thereby folding in the side portions of the extending ends of the wrapper, as shown in Fig. 28. Then the carrying plunger 95 moves upward thereby causing the folding wings 110 to be returned to their normal position, and the parts come back to the raised position, shown in Figs. 17 and 18.

The folding wings 110 are preferably pivoted with the axes of each pair of wings in the same plane but inclined outwardly and downwardly, so that, as the wings swing inward they will have a slightly downward movement, which is found to aid in securing a proper positioning of the folds of the wrapper. This is also of advantage because when the wings are in their normal retracted positions they will stand slightly inclined outwardly downwardly in order that when the plungers move downward the folding wings and the edges of the arms 111 will not come in contact with the wrapper sheet in a way to disarrange the same.

For folding upward the bottom portions of the extending ends of the wrapper, the carrier 25 is preferably provided with pivoted folders 130 which normally lie with their folding faces flush with the surface of the carrier, as shown in Figs. 17, 20 and 21, in which position they are held by means of springs 131.

After the top and side portions of the extending ends of the wrapper have been folded, as shown in Fig. 28, the folders 130 are swung upward to the position shown in Fig. 26, thereby folding the bottom portions of the extending ends of the wrapper upward against the end of the package and completing the folding of the package X, as shown in Fig. 29. The folders 130 are then preferably maintained in their upturned position to hold the ends of the wrapper in place while the carrier makes its next movement, thereby also securing a better set of the ends of the wrapper than would result if they are immediately released.

The folders 130 are preferably operated by means of a wedge cam 132 arranged beneath the carrier 25 and in position to engage downwardly extending arms 133 of the folders. This cam 132 is preferably given a movement to cause it to actuate the folders before the carrier begins its next movement and to cause their folding movement to follow closely the withdrawing movement of the folding wings 110 so as not to give time for the side folds to spring out, and, for this purpose, it is preferably carried by an arm 134 supported by means of a collar 135 to swing concentrically with the carrier 25 (see Figs. 13, 14 and 56), and the outer end of the arm 134 carries a segment gear which meshes with a similar gear 136 on a pivoted arm 137 which is oscillated by means of a cam 138 on a vertical shaft 206 engaging a cam roll 139 on the arm 137 to move it against the tension of a spring 140. The cam 138 is formed to cause the wedge shaped cam 132 to be moved forward after the folders 101 and the folding wings 110 have operated, and thereby to actuate the folders 130, and then as the carrier 25 makes its next movement to move with the carrier and maintain the folders 130 in their upturned position, and then after the carrier 25 comes to its next position of rest, the cam is slightly retracted to carry its rear end clear of the arms 133 and permit the folders 130 to be returned to normal position by the spring 131. The cam 132 is preferably formed, as shown in dotted lines in Fig. 13, with a concentric portion extending beyond the wedge shaped or actuating portion thereof. The next operation on the cigarettes is to transfer the package X thus formed from the wrapping carrier and deposit it in a box. For presenting the boxes for receiving the packages of cigarettes, I preferably provide an intermittently rotating carrier 150, provided with a plurality of box holders 151 arranged radially. This carrier may conveniently be and preferably is mounted concentrically with the wrapping carrier 25 and connected to move therewith. When so mounted it will be of a greater diameter than the wrapping carrier so that the holders 151 will lie beyond the edge of the wrapping carrier.

The boxes may be supplied to the holders 151 in any suitable manner, but preferably blanks are fed into position over the holders and formed therein by means of a reciprocating die, as described in the Patent No. 482,542 before referred to. I preferably use blanks substantially of the form shown in Fig. 63 for forming boxes or box slides to be inserted into tubular covers or shucks and feed such blanks successively to the holders as the latter are successively brought into position to receive the blanks by blank feeding devices which will now be described, (see Figs. 56 to 60): The banks are fed successively from a magazine 155 by means of a pusher 156 mounted to reciprocate beneath the magazine and forming the bottom thereof, the magazine being formed with a delivery opening 157. For adjusting the height of the delivery opening 157, a gage 158 is provided carried by a plate secured to the front wall of the magazine and adjustable vertically as by means of the adjusting screw 159 and set screw 160. The pusher 156 is mounted on a slide 161 and is formed by a plate provided with a pushing shoulder 162 adapted to engage the rear edge of the bottom blank in the magazine to advance the blank from the magazine, and with a second shoulder 163 which, after the return movement of the pusher and as it begins its next forward movement, engages the rear edge of the blank which has been advanced from the magazine, to advance it into position over the holder 151, which is then in position to receive a box. In order to prevent the blank which has been advanced from the magazine returning with the pusher on its return movement, retaining fingers 164 are provided adapted to engage the blank as by entering the side notches therein, and thereby hold it against backward movement. Guide springs 165 are also preferably provided for bearing lightly on the upper side of the blank as it is advanced from the magazine to insure the rear edge of the blank dropping to be engaged by the shoulder 163 and to prevent its buckling or becoming displaced.

In order to prevent the edges of the side notches of blanks of the form shown in Fig. 63 from interfering as the bottom blank is fed from the holder, lugs 155$^a$ are provided in the magazine in position to extend into the side notches of the blanks and to permit the edges of the bottom blank to pass beneath them as shown in Fig. 62, and having forwardly extending lips 155$^b$ which serve to separate the front edges of the notches of the blank next above the bottom from engaging the rear edges of the notches of the bottom blank as the latter is fed forward.

Any suitable means may be provided for reciprocating the slide 161. As shown, the slide is provided with a rack which meshes with a gear 166, the shaft of which carries a pinion 167ª meshing with a segment gear 167, which receives its oscillations from an eccentric 168 through connecting rod 169. The eccentric 168 is mounted on a shaft 170. The pinion 167ª is preferably held against rotation on the shaft by means permitting the pinion to rotate without rotating the shaft when the resistance to the rotation of the shaft is increased beyond a certain limit. For this purpose, the pinion is shown as normally locked to the shaft by a spring pressed dog 167ᵇ entering a recess in the pinion.

A blank having been advanced into position over a holder 151, it is pressed downward into the holder and the box or slide thereby partly formed by means of a die 171 carried by a slide 172 mounted in vertical bearings and reciprocated by means of an eccentric 173 on the shaft 170 through connecting rod 174. A box having been thus formed in the holder 151, is, by the next movement of the carrier 150, in the machine shown, brought into position to receive the package of cigarettes. The mechanism for transferring the package of cigarettes from the wrapping carrier to the box thus presented to receive it, may be of any suitable construction. The construction shown is, however, preferred and forms a feature of the invention.

Referring to Figs. 1 and 30 to 36, the packages of cigarettes are transferred from the wrapping carrier and deposited in the boxes by means of a transferring carrier arranged to reciprocate both horizontally and vertically. This carrier in its preferred form comprises a plunger head 175 carried by a hollow plunger stem 176 mounted so as to be capable of reciprocating vertically in a carriage 177. The head 175 carries a pair of pivoted, downwardly projecting gripping plates 178, which are actuated by means of slides 179 mounted in the plunger head and normally held against the tension of spring 180 in their outer or non-gripping position, as shown in Fig. 33, by means of a head 181 carried by a plunger stem 182 mounted to have vertical movement within the hollow plunger stem 176. The head 181 also preferably carries a pressing plate 183.

The carriage 177 is mounted to slide on shafts 185 and 186, which shafts have splined thereon, but free to move with the carriage, pinions 187 and 188 respectively. The pinion 187 is in position to engage a rack 189 on the plunger stem 182, and the pinion 188 is in position to engage a rack 190 on the plunger stem 176. By this construction it will be seen that the plunger stems may be reciprocated vertically independently of each other by the rocking of the shafts 185 and 186, while at the same time the carriage is free to slide on the shafts for moving the carrier horizontally.

Any suitable means may be provided for rocking the shafts 185 and 186 and for reciprocating the carriage. As shown, the shafts receive their rocking movements from a cam 192 on the shaft 170 by the following means: The shafts 185 and 186 carry pinions which mesh with segment gears 193 and 194 respectively, and these segment gears are oscillated through connecting rods 195 and 196 by levers 197 and 198 respectively. The lever 198 is fast on a rock shaft 199 which carries at its other end an arm 200 which carries a cam roll running in a cam groove 201 of the cam 192, and the arm 197 is fast to a sleeve mounted on the shaft 199 and free to rock thereon, and which carries an arm 202 having a cam roll running in a cam groove 203 of the cam 192. The carriage 177 receives its movement from a cam 205 mounted on the vertical shaft 206 and operating a lever arm 207 which is connected to the carriage by connecting rod 208, as shown clearly in Fig. 30. The shaft 206 is driven by bevel gears 211 from the shaft 170. The cams 201, 203 and 205 are formed so as to rock the shafts 185 and 186 and reciprocate the carriage to give the plungers 175 and 181 the desired gripping and transferring movements as follows: The carrier 25 having moved to bring a package of cigarettes into position to be transferred, and the transferring carrier being in the position shown in Fig. 31, the plungers 175 and 181 are first moved downward together and then the plunger 181 is given a further downward movement to allow the slides 179 to move inward under tension of spring 180, thus swinging the plates 178 inward to grip the ends of the package, as shown in dotted lines in Fig. 31, the plate 183 at the same time moving down into position to bear on the top of the package. The carriage 177 is then caused to slide outwardly to cause the carrier to carry the package clear of the wrapping carrier 25 and into position over the box holder 151, as shown in full lines in Fig. 32. The plungers 175 and 181 are then given a further downward movement to deposit the package in the box as represented in dotted lines in Fig. 32. The plunger head 181 next begins its upward movement, thereby forcing the slides 179 outwardly and moving the plates 178 to release the package, then the plunger head also moves upward and the carriage is caused to slide inward again to the position shown in Fig. 31.

For supporting the bottom of the package during a portion of the transferring movement, a table 209 is preferably provided having its upper surface level with the bottom of the pockets of the carrier 25 and having an opening 210 through which the transferring carrier and package move downward for depositing the package in the box.

After the package has been deposited in the box, the carrier 150 makes its next movement, and, in the machine shown, this movement brings the holder containing the box into which the package of cigarettes has just been deposited into position to have the cigarette holders or mouthpieces deposited in the box beside the package of cigarettes. It will be understood that the box will be of such a width as to permit the holders to be placed therein at one side of the package of cigarettes. Any suitable mechanisms may be employed for conveying the holders and depositing them in the boxes beside the package of cigarettes, but the mechanisms shown, including a hopper and means for feeding the holders from the hopper and nesting them to form a row of nested holders, are preferred and form part of the invention.

Referring to Figs. 1 and 37 to 55 of the drawings, the construction shown is designed to automatically feed the holders from a hopper or magazine to form them into a nested row and to advance successively from the row bunches of a predetermined number of holders, five in the present case, and deposit the bunches in charges of two each in the boxes, one over the other, and arranged with the holders pointing in opposite directions, that is, with the small ends of the holders of one bunch pointing in the direction of the large ends of the holders of the other bunch. For securing this reverse arrangement of the two bunches of holders forming a charge, I preferably employ a rotating carrier which, after receiving one bunch of a charge of holders, is given a half rotation before receiving the second bunch, so that the two bunches shall lie parallel but oppositely arranged, the carrier then descending to deposit the charge of holders in the box.

Referring to the drawings, the holders are placed in a hopper or magazine 215, in which they may be placed without regard to position or arrangement. The hopper 215 is provided with an inclined and vibrating bottom 216, the vibrating edge of which extends to within a distance from the adjacent side of the hopper sufficient to leave a space wide enough to permit the holders to pass through, and the side of the hopper opposite the vibrating edge of the bottom is formed with a series of projections which form between them recesses 217 of a size corresponding to the larger end of the holders. By this construction, the holders in the hopper will be maintained in a continual state of agitation by the movements of the bottom 216, and the holders will be fed from the magazine small end first through the recesses 217, the edge of the bottom engaging and throwing upward again such holders as get into position with their large end downward, and urging downward the holders which are between the edge of the bottom and the recesses small end downward. The bottom 216, as before stated, preferably slants downward toward the opening, and its vibrating edge, when in its lowest position, is preferably below the plane of its pivotal axis, so that, as it moves upward, it will slightly approach the opposite wall of the hopper, and as it moves downward, will move slightly away therefrom, so as to permit the large ends of the holders to pass it.

Beneath the hopper there is a passageway 219 having an inclined bottom in which runs the upper run of a feeding belt 220. This passage beneath the hopper is preferably of a form substantially as shown in Fig. 40, having an outward and downward extension of a depth less than the diameter of the large end of the holders, the feeding belt 220 extending beneath this portion of the passage as well as beneath the main portion thereof. The passage 219 connects with a channel 222, in a channel bar 223, through which the nested holders are advanced to the counting and feeding devices, by which the charge of holders is delivered to the carrier. The end of the channel 222 corresponds substantially in form with the passage 219, except that the upper side is continued to form a closed top, as shown in section in Fig. 49, but from this point the passage gradually approaches a cylindrical form, as shown in section in Fig. 47, said figure showing the end of a holder in position therein. The feeding belt 220 extends beyond the passage 219 a short distance beneath and to form the bottom of the channel 222 and preferably beyond the point at which the channel 222 becomes cylindrical except on the side toward the belt, where it is open, as shown in Fig. 48. The feeding belt is supported on rolls 224 and 225, and the roll 224 (see Figs. 43 and 44) is driven by means of bevel gears 226 from a shaft 227 which shaft is driven by means of a sprocket chain 228 from the shaft 170. The shaft 227 also carries a gear 229, which meshes with a pinion fast to an eccentric 230, the strap of which is connected by a pitman 231 to an arm on the shaft of the vibrating bottom 216, as shown in Fig. 39. The belt roll 225 is shown as carried by an adjustable slide 232 for the purpose of adjusting the tension of the feed belt 220.

As the holders are fed from the hopper into the passageway 219, their small ends which are downward, will first engage the feeding belt 220 whereby the holders will be caused to assume an inclined position in the passageway 219 with their small ends foremost. The belt 220 is driven at such a speed that as holders successively drop onto the belt they will be advanced rapidly through the passage 219 and entered into the channel 222, and as successive holders are fed into the channel 222, they will become nested therein, the small ends of succeeding holders entering the large ends of the preceding holders. The supply of holders from the hopper to the passage 219 and therefrom to the channel 222, will be sufficient to supply fresh holders to the channel 222 as fast as the holders are fed therefrom to the carrier and thus always maintain a row of nested holders in the channel 222 under tension to move forward through the channel by reason of the action of the feeding belt 220 on the holders in that part of the channel toward the entrance end thereof. If more than the required number of holders tends to pass from the hopper into the passage 219, their complete passage from the hopper into the passageway will be prevented by the holders already in the passageway and which are being advanced therethrough.

The holders are fed from the channel 222 in bunches of the required number and delivered to the carrier, by which they are deposited in the box by means of a feeding gripper comprising a pair of spring actuated jaws 235 carried by a slide 236, said jaws having access to the line of holders through slots in channel bar 223. The jaws 235 are preferably pivoted to the slide and connected to move in unison as by gear segments as shown. The forward movement of the column of holders in the channel 222 is normally limited by means of a pair of jaws 238 mounted in slots in the channel bar and placed at right angles to the jaws 235 and which jaws are normally held in their closed position by means of a lock-plate 240 mounted to have a movement longitudinally of the channel 222 and having an opening therein of a width in one direction such that its edges will bear on the jaws 238 to close them when the plate is moved toward the jaws, and extended in the other direction sufficiently to permit the projection of the ends of the feeding jaws 235 therethrough. The plate 240 is carried by sliding rods 241 which are guided at the end toward the plate by supports on the brackets 242 which supports the delivery end of the channel bar 223 and also guided by brackets 243 on the slide 236. The plate is under tension, as by a spring 247, to move forward to release the holding jaws 238, its forward movement being limited by a stop 248, and it is normally held in its jaw closing position by engagement of one of the brackets 243 with a stop 249 on one of the rods 241, as shown in Fig. 44, the slide 236 being normally held in its retracted position, as shown in this figure. When the slide is in its retracted position, the feeding jaws 235 are held slightly apart as by engagement with shoulders of the channel bar 223, as shown in Fig. 51, to permit the feeding of the column of holders between the jaws.

The slide 236 is caused to make two quick forward and return reciprocations for each depositing movement of the cigarette holder carrier and for each movement of the boxing carrier 150, so as to feed to the holder carrier a charge consisting of two bunches of holders, each bunch, in the present machine, consisting of five holders. As shown, the slide 236 is reciprocated by means of a lever 255, one arm of which is connected to the slide by a link and the other arm of which is connected by a link 256 with one arm of a bell-crank lever 257, the other arm of which carries a cam-roll running in contact with a cam 258 on the shaft 20, by which these parts are moved against the tension of a spring 259, the cam 258 being formed to give the slide two quick forward and backward reciprocations for each revolution of the shaft 20.

As the slide moves forward from the position shown in Figs. 44 and 51, the gripping jaws 235 approach each other, as the slide begins its forward movement and engage the rear end of the fifth holder in the channel, and then feed the first five holders forward and from the channel into the holder carrier, the plate 240 having been allowed to move under the tension of its spring 247 to release the jaws 238 and permit the holders to be fed past said jaws. The jaws 238 are preferably under light tension, as by means of springs 260, so as to bear lightly against the holders as they are advanced between the jaws and thereby truly guide them to the carrier. A clamping device is provided to prevent the main portion of the column of holders in the channel 222 from moving forward as the first five holders are advanced by the jaws 235. This clamping device is preferably formed by a pair of pivoted clamping jaws 261 which, as the slide 236 begins its forward movement, spring inward to engage and hold against forward movement the holders beyond the one engaged by the jaws 235. The ends of the jaws are preferably provided, as shown in Fig. 44, with sharp projections or pins 261ª adapted to positively hold the holder next beyond the last holder of the bunch being advanced from the row. The clamping jaws 261 remain in their clamping position during the forward movement of the slide and are retracted again to permit the feeding forward of the column of holders in the channel after the holding jaws 238 have been again closed. The clamping jaws are preferably actuated through the movements of the slide 236, and, for this purpose, they are provided with outwardly extending lugs 262 adapted to be engaged by the end of the slide as the latter returns to its normal retracted position, whereby the clamping jaws will be thrown outward to permit the forward movement of the column of holders, and the outer edges of the clamping jaws are so formed that, by engagement therewith of a part moving with the slide, the jaws will, during the movement of the slide, be held in their clamping position. For engaging the clamping jaws to throw them into clamping position, the slide is preferably provided with adjustable bearing lugs 263.

As the holders are delivered from the channel 222 they are, as before pointed out, received by a carrier which, in the machine shown, is adapted to receive a charge of two bunches of holders and then deposit the same in the box beside the package of cigarettes. This carrier, as shown is formed by a depositing plunger 265, which carries opposite pivoted side plates 266 having their lower ends extended inwardly to form supports for the holders and which are normally held in their inner or supporting position, as by spring 267.

The plunger 265 is carried by a hollow plunger stem 268, which is splined to reciprocate vertically in a sleeve 269, which sleeve is rotatably mounted in a bearing 270 and carries a pinion 271 meshing with a rack 272 mounted to slide horizontally. The rack 272 is reciprocated by means of a lever 273, one arm of which is connected by a link to the rack and the other arm of which is connected by a link 274 to one arm of a bellcrank lever 275, the other arm of which carries a cam roll running in contact with a cam 276 on the shaft 20, by which cam these parts are operated against the tension of a spring 277. Mounted to reciprocate vertically within the plunger stem 268, is a second plunger stem 280 which carries at its lower end a head 281, which, when it is given a downward movement relatively to the plunger 265, engages cam lugs 282 on the pivoted plates 266 and thereby forces the plates outward to withdraw the supports from beneath the holders. The under face of the plunger head 281 also serves as a presser plate for packing the holders in the boxes. Studs 281ᵃ on the plunger head 281 serve to guide the plunger head and to hold the plates 266 retracted when the plunger head 281 is depressed relatively to the plunger 265.

The plunger stem 280 extends above the plunger stem 268 and has a yielding connection thereto by means of a spring 283 which is conveniently a spiral spring, as shown, placed about the stem 280 and bearing on the upper end of the stem 268 and a collar on the stem 280, and by which spring the plunger stem 268 and plunger 265 are normally pressed downward against the head 281. The downward movement of the plunger stem 268 is limited as by means of a collar 284 thereon.

The plunger stem 280 is reciprocated, as shown, by means of a lever 285, one arm of which has connection with the plunger stem and the other arm of which carries a cam roll held by a spring 286 in contact with a cam 287 on the shaft 20.

When the plunger stem 280 is raised to its uppermost position, the plunger 265 will be raised by the plunger head 281 and the parts will be in the position shown in Fig. 51 with the lower portion of the holder receiving chamber opposite the end of the channel 222. Then the slide 236 will make one of its forward reciprocations and feed a bunch of five holders to the depositing plunger and then return to its retracted position. The plunger stem 280 will then be given a slight downward movement to carry the depositing plunger downward a distance about equal to the larger diameter of the cigarette holders, and the rack 272 will be moved to give the sleeve 269 and thereby the depositing plunger a half rotation, thus bringing the plunger into the position shown in Figs. 37 and 52. The slide 236 will then make its second forward movement to feed the second bunch of five cigarette holders into the depositing plunger, as shown in Fig. 52. The two bunches of holders will thus lie in the depositing plunger one over the other and in reverse positions, that is, with the small ends of the holders of one bunch pointing in the direction of the large ends of the holders of the other bunch. The boxing carrier 150 having been meanwhile moved to bring a box holder into position beneath the depositing plunger, the plunger stem 280 will be given a further downward movement carrying the plunger head 265 downward with it until further downward movement of the plunger head is prevented by the collar 284. The plunger stem 280 then continuing its downward movement, it causes the supports to be withdrawn, as shown in Fig. 54, and the under face of the plunger head 281 then acts to pack the holders in the box beside the package of cigarettes insuring their proper positioning therein. The plunger stem 280 is then raised again and the depositing plunger returns to the position shown in Fig. 51.

In order to insure the package being in position in the box to leave a space at one side thereof to receive the holders and to prevent injury to the edge of the package by the feeding of the holders into the box a spring plate 288 is preferably provided for bearing lightly on the top of the package as a pocket with a package therein comes into position to receive the holders, thereby crowding the package against the rear side of the box and insuring a sufficient space between the package and the front side of the box to receive the holders, the edge of the plate also being in position to lie above and protect the edge of the package when the box is in the holder receiving position. The plate 288 may be mounted in any suitable manner. As shown, it is pivoted to a downwardly extending support 289 and pressed downward by a spring 289ª, see Figs. 51 and 52.

After each depositing movement of the depositing plunger 265, the boxing carrier 150 makes a forward movement to bring pockets containing boxes with packages of cigarettes therein successively beneath the depositing plunger and to advance the completely filled boxes to have the folding thereof completed. When boxes are used having end flaps of considerable length to be turned down over the contents of the box, I preferably provide means for folding over these end flaps as the holder containing the box approaches the position in which the box is fed therefrom. For this purpose, I preferably provide turning guides 290 and 291, which extend over the path of the holders 151. The continued step by step movements of the carrier 150 bring the filled boxes around to the position where they are to be fed from the carrier after having moved past the guides 290 and 291. If the boxes are to be inserted in shucks or covers, the covers may be supplied by any suitable mechanism from a suitable source, as from a magazine 295, by means of a pusher 296, and may be positioned by any suitable mechanism to receive the filled boxes, as, for example, by the cover opening and positioning mechanism shown in the United States Patent No. 482,542, hereinbefore referred to. The filled boxes are advanced from the holders 151 through a raceway 297 by means of a slide 298, which also acts to fold down or complete the folding down of the top flap of the box, and by which movement through the raceway 297 the box is inserted into the cover which has been positioned and opened in the raceway. These parts are or may be constructed and operated as shown in the said United States Patent No. 482,542.

When the box is provided with side wings extending from the top flap and adapted to be turned down outside of and to overlap the sides of the box which are turned up from the bottom, turner guides 299 are preferably provided for turning down such side wings as the box is advanced through the raceway 297. These guides are or may be constructed as shown in United States Patent No. 708.789, dated September 9, 1902.

In order to prevent the extended flaps of the box blank from contacting with the gears which drive the wrapper feeding rolls 32 and 33, a guard plate 300 is preferably provided extending beneath said gears.

The carriers 25 and 150 may be given their step by step movement by any suitable mechanism. As shown, the carrier 150 is formed on its underside with a plurality of radial pockets 310 corresponding in number with the holders on the carrier 150 and pockets on the carrier 25, and a rotating arm 311 carrying a roll 312 is mounted in position so that at each rotation of the arm 311 the roll 312 will enter one of the pockets and move the carriers forward one step. The arm 311 is driven by a train of gears from the shaft 206, as shown in dotted lines in Fig. 13.

As shown, the shaft 170 is the main driving shaft of the machine, the shafts 20, 206 and 227 being driven from this shaft by driving connections already described. The shaft 170 carries a driving pulley 315 mounted to rotate thereon and adapted to be clutched to a sleeve 316 also mounted free to rotate on the shaft 170. The sleeve 316 carries a gear meshing with a gear 317 on a shaft 318 which carries a gear meshing with a gear 319 on the shaft 170. For clutching the sleeve 316 to the driving pulley 315, the sleeve is shown as mounted to slide on the shaft 170 and is provided with a clutching disk 320, the sleeve being moved to carry the clutching disk into and out of clutching position by suitable connections from a treadle 321.

The general operation of the machine will be understood from the description hereinbefore given and need not be further set out.

It will be understood that various changes and modifications may be made in the construction and arrangement of the parts as shown and to which the foregoing description has been mainly confined, and that the invention is not to be limited to the exact constructions and arrangements shown, but includes various changes and departures therefrom within the claims. It will be understood, also, that parts of the machine shown may be used independently of other parts or in connection with other machines.

The expression "uncut wrapper sheet" is used in the claims to distinguish clearly in terms from blanks such as used in applicant's machine for forming the slide or inner portion of the box; that is blanks cut and scored to form side, end and top flaps.

What I claim is:—

1. The combination with a carrier having a pocket for receiving articles, means for feeding a flexible wrapper sheet into position over the pocket, depositing mechanism for carrying a predetermined quantity of articles against the wrapper sheet and into the pocket, whereby the wrapper sheet is forced into the pocket and partially folded about the articles, folding devices for completing the folding of the wrapper sheet about the articles, a box presenting mechanism, and transferring mechanism for transferring the package from the carrier and depositing it in the box, substantially as described.

2. The combination of wrapping mechanism for folding a flexible wrapper sheet about a predetermined quantity of articles to form a package, a box presenting mechanism, depositing mechanism for delivering the packages to the boxes, and covering and delivering mechanism by which the folded boxes are delivered from the box presenting mechanism and inserted in tubular covers, substantially as described.

3. The combination of an intermittently moving carrier provided with a plurality of box holders, mechanism coöperating with said holders to fold and deliver boxes thereto, wrapping mechanism for folding a flexible wrapper sheet about a predetermined quantity of articles, depositing mechanism to which the boxes are advanced from the box forming mechanism by the carrier and by which the packages are deposited in the boxes, and covering and delivering mechanism to which the boxes are advanced from the depositing mechanism and by which they are delivered from the carrier and inserted in tubular covers, substantially as described.

4. The combination of an intermittently moving carrier provided with a plurality of box holders, wrapping mechanism for folding flexible wrapper sheets about predetermined quantities of articles, a depositing mechanism to which the boxes are advanced by the carrier and by which the packages are deposited in the boxes, and means for closing the boxes after the packages are deposited therein, substantially as described.

5. The combination with an intermittently moving carrier provided with a plurality of pockets, means for depositing predetermined quantities of articles in the pockets, wrapping mechanism for folding a flexible wrapper sheet about the articles in the pockets, a second intermittently moving carrier provided with a plurality of box holders, and a carrier by which the packages are transferred from the first carrier and deposited in the boxes on the second carrier, substantially as described.

6. The combination with an intermittently moving carrier provided with a plurality of article receiving pockets, wrapping mechanism for folding flexible wrapper sheets about the articles in the pockets, a box presenting mechanism for presenting boxes open at the top, and transferring mechanism by which the packages are transferred from the carrier and deposited from above flatwise in the boxes, substantially as described.

7. The combination with an intermittently moving carrier provided with a plurality of article receiving pockets, wrapping mechanism for folding flexible wrapper sheets about the articles in the pockets, a second intermittently moving carrier provided with a plurality of box holders, and transferring mechanism by which the packages are transferred from the first carrier and deposited flatwise from above in the boxes on the second carrier, substantially as described.

8. The combination with an intermittently moving carrier provided with a plurality of article receiving pockets, wrapping mechanism for folding flexible wrapper sheets about the articles in the pockets, a second intermittently moving carrier provided with a plurality of box holders, transferring mechanism by which the packages are transferred from the first carrier and deposited in boxes on the second carrier, and means for inserting the boxes in tubular covers, substantially as described.

9. The combination of an intermittently rotating carrier provided with a plurality of article receiving pockets, wrapping mechanism for folding flexible wrapper sheets about the articles in the pockets, a second intermittently rotating carrier mounted to rotate concentrically with the first said carrier and provided with a plurality of box holders, and transferring mechanism for transferring packages from the first said carrier and depositing them in the boxes on the second carrier, substantially as described.

10. The combination of an intermittently rotating table carrying a plurality of article receiving pockets, a second intermittently rotating table mounted to rotate concentrically with, and of a greater diameter than, the first said table, and carrying a plurality of box holders arranged thereon beyond the edge of the first said table, and transferring mechanism for transferring articles from the pockets of the first table and depositing them in the boxes on the second table, substantially as described.

11. The combination with an intermittently rotating table carrying a plurality of article receiving pockets, means for feeding predetermined quantities of articles into the pockets, means for feeding wrapper sheets into position over the pockets when the latter are in receiving position whereby the wrapper sheets will be carried down into the pockets with the articles and partially folded about the same, means for completing the folding of the wrapper sheets about the articles to form a package, a second intermittently rotating table arranged concentrically with, and of a greater diameter than, the first said table and carrying a plurality of box holders arranged thereon beyond the edge of the first said table, means for supplying boxes to said holders, and transferring mechanism for transferring the packages from the pockets of the first said table and depositing them in the boxes on the second said table, substantially as described.

12. The combination with an intermittently moving carrier provided with a plurality of box holders, means for feeding predetermined quantities of articles, means for securing each predetermined quantity together, mechanism to which the boxes are advanced by the carrier and by which the packages of articles are delivered to the boxes, and means for inserting the boxes in tubular covers, substantially as described.

13. The combination with an intermittently moving carrier provided with a plurality of box holders, means for feeding predetermined quantities of articles, means for securing each predetermined quantity together, mechanism to which the boxes are advanced by the carrier and by which the packages of articles are delivered to the boxes, and means for closing the boxes after the packages are placed therein, substantially as described.

14. The combination of means for feeding cigarettes or similar articles into a receptacle, and means independent of the cigarette feeding means for feeding cigarette holders into the receptacle, substantially as described.

15. The combination with mechanism for feeding cigarettes or similar articles into a receptacle, mechanism for feeding cigarette holders into the receptacle, and means for presenting the receptacle to said mechanisms successively, substantially as described.

16. The combination of mechanism for feeding cigarettes or similar articles into a receptacle, mechanism for feeding cigarette holders into the receptacle, and means for presenting the receptacle to the cigarette feeding mechanism and subsequently presenting the receptacle with the cigarettes therein to the holder feeding mechanism, substantially as described.

17. The combination of packaging mechanism for forming packages of cigarettes or similar articles, mechanism for feeding the packages into receptacles, and mechanism for feeding cigarette holders into the receptacles, substantially as described.

18. The combination of packaging mechanism for forming packages of cigarettes or similar articles, mechanism for feeding the packages of cigarettes into receptacles, and mechanism independent of the cigarette feeding mechanism for feeding cigarette holders into the receptacles, substantially as described.

19. The combination of packaging mechanism for forming packages of cigarettes or similar articles, feeding mechanism for feeding the packages of cigarettes into receptacles, holder feeding mechanism for feeding cigarette holders into the receptacles, and means for presenting the receptacles to the cigarette feeding mechanism and subsequently presenting the receptacles with the package of cigarettes therein to the holder feeding mechanism, substantially as described.

20. The combination of wrapping mechanism for wrapping a sheet about a charge of cigarettes or similar articles to form a package, feeding mechanism for feeding the packages into receptacles, and holder feeding mechanism for feeding cigarette holders into the receptacles, substantially as described.

21. The combination of wrapping mechanism for wrapping a sheet about a charge of cigarettes or similar articles to form a package, feeding mechanism for feeding the packages into receptacles, and holder feeding mechanism independent of the package feeding mechanism for feeding cigarette holders into the receptacle, substantially as described.

22. In a machine for filling receptacles with cigarettes or similar articles, the combination of mechanism for feeding packages of cigarettes into the receptacles, and mechanism for feeding cigarette holders into the receptacles, substantially as described.

23. In a machine for filling receptacles with cigarettes or similar articles, the combination of mechanism for feeding packages of cigarettes into the receptacle, mechanism for feeding cigarette holders into the receptacle, and means for presenting the receptacle to said mechanisms successively, substantially as described.

24. In a machine for filling receptacles with cigarettes or similar articles, the combination of mechanism for feeding the cigarettes into the receptacles, and means independent of the cigarette feeding mechanism for feeding a charge of nested cigarette holders into the receptacles, substantially as described.

25. In a machine for filling receptacles with cigarettes or similar articles, the combination of mechanism for feeding the cigarettes into the receptacle, mechanism for feeding a charge of nested cigarette holders into the receptacle, and means for presenting the receptacle to said mechanisms successively, substantially as described.

26. In a machine for filling receptacles with cigarettes or similar articles, the combination of mechanism for feeding the cigarettes into the receptacle, and mechanism independent of the cigarette feeding mechanism for feeding into the receptacle two oppositely arranged bunches of nested cigarette holders, substantially as described.

27. In a machine for filling receptacles with cigarettes or similar articles, the combination of mechanism for feeding packages of the cigarettes into the receptacles, and mechanism for feeding into the receptacle two oppositely arranged bunches of nested cigarette holders, substantially as described.

28. In a machine for filling receptacles with cigarettes or similar articles, the combination of mechanism for feeding packages of the cigarettes into the receptacles, and mechanism independent of the cigarette feeding mechanism for feeding into the receptacle two oppositely arranged bunches of nested cigarette holders, substantially as described.

29. The combination of an intermittently moving carrier provided with a plurality of box holders, mechanism for feeding cigarettes or similar articles to the boxes in the holders, and a cigarette holder feeding mechanism to which the boxes are advanced from the cigarette feeding mechanism by the carrier, substantially as described.

30. The combination with an intermittently moving carrier provided with a plurality of box holders, of mechanism coöperating with said holders to form and deliver boxes thereto, mechanism for feeding cigarettes or similar articles into the boxes to which mechanism the boxes are advanced from the box forming mechanism by the carrier, and mechanism for feeding cigarette holders into the boxes to which the boxes are advanced from the cigarette feeding mechanism by the carrier, substantially as described.

31. The combination with an intermittently moving carrier provided with a plurality of box holders, of mechanism coöperating with said holders to form and deliver boxes thereto, mechanism for feeding cigarettes or similar articles into the boxes to which mechanism the boxes are advanced from the box forming mechanism by the carrier, mechanism for feeding cigarette holders into the boxes to which the boxes are advanced from the cigarette feeding mechanism by the carrier, and covering and delivering mechanism to which the boxes are advanced from the holder feeding mechanism and by which they are delivered from the carrier and inserted in tubular covers, substantially as described.

32. The combination of feeding devices for feeding a row of nested cigarette holders longitudinally, means for advancing bunches of a predetermined number of holders from the row, a hopper, and means for feeding holders from the hopper and advancing them to the nested row, substantially as described.

33. The combination of a hopper for conical cigarette holders, means for feeding the holders small end downward from the hopper, and means for nesting the holders as they are fed from the hopper and for advancing the row of nested holders longitudinally, substantially as described.

34. The combination of a hopper for conical cigarette holders, means for feeding the holders small end downward from the hopper, means for nesting the holders as they are fed from the hopper and for advancing the row of nested holders longitudinally, and means for advancing bunches of a predetermined number of holders from the row, substantially as described.

35. The combination of a hopper for conical cigarette holders, a passageway beneath the hopper, means for feeding holders small end downward from the hopper into said passageway, and means for feeding the holders longitudinally through said passageway and nesting them to form a row of said holders, substantially as described.

36. The combination of a hopper for conical cigarette holders, a passageway beneath the hopper, means for feeding the holders small end downward from the hopper into said passageway, means for feeding the holders longitudinally through said passageway, and a channel for receiving the row of nested holders as they are advanced from the passageway, substantially as described.

37. The combination of a hopper for conical cigarette holders, a passageway beneath the hopper, a channel leading from said passageway, a feeding belt forming the bottom of said passageway and of a portion of said channel, and means for feeding the holders small end downward from the hopper into said passageway, substantially as described.

38. The combination of a hopper for conical cigarette holders, a passageway beneath the hopper having its bottom formed by a feeding belt running longitudinally of the passageway and inclined transversely, and means for feeding the holders small end downward from the hopper into said passageway, substantially as described.

39. The combination of a hopper for conical cigarette holders, of a passageway beneath the hopper having its bottom inclined transversely, means for feeding the holders small end downward from the hopper into said passageway, means for feeding the holders longitudinally through said passageway, and a channel leading from the passageway of a size to bring the holders longitudinally in line, substantially as described.

40. The combination of a hopper for conical cigarette holders, a passageway beneath the hopper having its bottom formed by a feeding belt running longitudinally of the passageway and inclined transversely and of a width considerably greater than the largest diameter of the holders, means for feeding the holders small end downward from the hopper into said passageway, and a guideway to which the holders are advanced from said passageway, substantially as described.

41. The combination with a hopper and means for feeding conical cigarette holders small end downward from the hopper, of a passageway 219 beneath the hopper, a channel 222 leading from the passageway, and a feeding belt 220 running longitudinally of the passageway and inclined transversely and forming the bottom of the passageway and of a portion of the channel, substantially as described.

42. A hopper for conical cigarette holders having a delivery opening in the bottom thereof, one side of which is formed by the edge of a vibrating member forming a part of the bottom of the hopper, and the other side of which is formed with recesses corresponding in size to the larger diameter of the holders, substantially as described.

43. A hopper for conical cigarette holders having a delivery opening in the bottom thereof, one side of which is formed by the edge of a vibrating member forming a part of the bottom of the hopper, and the other side of which is formed with recesses corresponding in size to the larger diameter of the holders, said vibrating member being inclined toward the opening and having a movement such that its edge will move toward the opposite side of the opening as it moves upward, substantially as described.

44. The combination with a hopper for conical cigarette holders having a delivery opening in the bottom thereof, one side of which is formed by the edge of a vibrating member forming a portion of the bottom of the hopper, and the other side of which is formed with a series of recesses corresponding in size to the larger diameter of the holders, of a passageway beneath the hopper, and means for feeding the holders longitudinally through said passageway, substantially as described.

45. The combination with means for nesting conical cigarette holders, and means for advancing the row of nested holders longitudinally, of means for advancing bunches of a predetermined number of holders from the row, substantially as described.

46. The combination with means for nesting conical cigarette holders, and means for advancing the row of nested holders longitudinally, of a carrier, and means for advancing bunches of a predetermined number of holders from the row to the carrier, substantially as described.

47. The combination of means for nesting conical cigarette holders, means for advancing the row of nested holders longitudinally, of a carrier, means for advancing bunches of a predetermined number of holders from the row to the carrier, said carrier being adapted to receive two bunches of holders, and means for giving the carrier a half rotation after receiving the first bunch of a charge of holders, substantially as described.

48. The combination of means for advancing a row of nested cigarette holders longitudinally, a carrier, means for advancing bunches of a predetermined number of holders from the row of the carrier, the carrier being adapted to receive two bunches of holders, and means for giving the carrier a half rotation after receiving the first bunch of a charge of holders, substantially as described.

49. The combination with means for advancing a row of nested cigarette holders, of a carrier for supporting and transferring bunches of holders, and means for advancing bunches of a predetermined number of holders from the row to the carrier, substantially as described.

50. The combination with mechanism for presenting a receptacle with cigarettes or similar articles therein, of means for feeding a bunch of nested cigarette holders into the receptacle beside the cigarettes, substantially as described.

51. The combination with mechanism for presenting a receptacle with cigarettes or similar articles therein, of means for depositing a bunch of nested cigarette holders in the receptacle, and means for crowding the cigarettes to one side to make room for the holders, substantially as described.

52. The combination with mechanism for presenting a receptacle with a package of cigarettes or similar articles therein, of means for depositing a bunch of nested cigarette holders in the receptacle, and a presser plate 288, the presser plate and the receptacle having a relative movement to crowd the cigarettes to one side to make room for the holders, substantially as described.

53. The combination with a carrier for advancing boxes with articles therein, of means for depositing other articles in the boxes, and means for crowding the articles in the boxes to one side of the box to make room for the other articles, substantially as described.

54. The combination of a carrier for advancing boxes with articles therein, of means for depositing other articles in the boxes, and a presser plate for bearing on the articles in the boxes as the boxes come into position to receive the other articles, substantially as described.

55. The combination with mechanism for presenting receptacles with cigarettes or similar articles therein, of means for advancing a row of nested cigarette holders longitudinally, means for advancing bunches of a predetermined number of holders from the row, and a packing carrier for receiving the bunches of holders and depositing them in the receptacle, substantially as described.

56. The combination with mechanism for presenting a receptacle with cigarettes or similar articles therein, of means for advancing a row of nested cigarette holders longitudinally, a carrier from which the holders are delivered to the receptacle, means for advancing bunches of a predetermined number of holders from the row to the carrier, said carrier being adapted to receive two bunches of holders, and means for giving the carrier a half rotation after receiving the first bunch of a charge of holders, substantially as described.

57. The combination of means for feeding cigarettes or similar articles into a receptacle, means for advancing a row of nested cigarette holders, means for advancing bunches of a predetermined number of holders from the row, a carrier adapted to receive two such bunches of holders and to deposit them in the receptacle, and means for giving the carrier a half rotation after receiving the first bunch of a charge of holders, substantially as described.

58. The combination of packaging mechanism for forming packages of cigarettes or similar articles, feeding mechanism for feeding the packages into receptacles, means for advancing a row of nested cigarette holders, means for advancing bunches of a predetermined number of holders from the row, a carrier adapted to receive two such bunches of holders and to deposit them in the receptacle, and means for giving the carrier a half rotation after receiving the first bunch of a charge of holders, substantially as described.

59. The combination of an intermittently moving carrier provided with a plurality of box holders, mechanism for feeding cigarettes or similar articles to the boxes in the holders, means for advancing a row of nested cigarette holders, means for advancing bunches of a predetermined number of holders from the row, and a packing carrier for receiving the bunches of holders and to which the boxes are advanced from the cigarette feeding mechanism by the box holding carrier, substantially as described.

60. The combination of an intermittently moving carrier provided with a plurality of box holders, mechanism for feeding cigarettes or similar articles to the boxes in the holders, means for advancing a row of nested cigarette holders, means for advancing bunches of a predetermined number of holders from the row, means for associating and arranging successive bunches as they are advanced from the row parallel but with the holders pointing in opposite directions, and means for depositing such associated bunches in the boxes, substantially as described.

61. The combination with mechanism for presenting a receptacle with cigarettes or similar articles therein, of means for advancing a row of nested cigarette holders longitudinally, means for advancing bunches of a predetermined number of holders from the row, means for associating and arranging successive bunches as they are advanced from the row parallel but with the holders pointing in opposite directions, and means for depositing such associated bunches in the receptacle, substantially as described.

62. The combination with means for advancing a row of nested cigarette holders longitudinally, means for advancing bunches of a predetermined number of holders from the row, and means for arranging successive bunches as they are advanced from the row parallel but with the holders pointing in opposite directions, substantially as described.

63. The combination with means tending to advance a row of nested cigarette holders longitudinally, a stop for engaging the end holder of the row to limit the forward movement of the row, means for advancing bunches of a predetermined number of holders from the row, means for moving said stop to permit the holders to be advanced, and a clamp for preventing forward movement of the rest of the row of holders when a bunch is being advanced, substantially as described.

64. The combination with means for feeding a row of nested cigarette holders longitudinally, of a reciprocating slide, spring pressed jaws carried by said slide for advancing bunches of a predetermined number of holders from the row, a clamp for determining the remaining holders, and means for actuating said clamp by the movement of said slide, substantially as described.

65. The combination with means for feeding a row of nested cigarette holders longitudinally, of a reciprocating slide, feeders carried by the slide for advancing bunches of a predetermined number of holders from the row, clamping jaws for preventing forward movement of the remaining holders, and abutments on the clamping jaws and the slide for moving the clamping jaws into clamping position as the slide moves forward and means for moving the clamping jaws to release the row of holders as the slide returns to its retracted position, substantially as described.

66. The combination with means for advancing a row of nested cigarette holders through a channel, of yielding guides for guiding the holders as they are advanced from the channel, substantially as described.

67. The combination with means for advancing a row of nested cigarette holders through a channel, of means for advancing bunches of a predetermined number of holders from the channel, and yielding guides for guiding the holders as they are advanced from the channel, substantially as described.

68. The combination with a channel 222 and means for advancing a row of cigarette holders therein, spring pressed guiding jaws 238, feeding devices for advancing bunches of a predetermined number of holders past said jaws, detaining means for preventing movement of the remaining holders during the operation of said feeding devices, and means for closing said jaws when said detaining means is not in operation and for releasing said jaws when said detaining means is in operation, substantially as described.

69. The combination with the channel 222 and means for advancing a row of cigarette holders therein, of the feeding jaws 235, means for reciprocating said jaws to advance bunches of a predetermined number of holders, guiding jaws 238, clamping jaws 261, and means for operating said guiding jaws and clamping jaws, substantially as described.

70. The combination with receptacle presenting mechanism, of a depositing plunger, means for feeding articles to the plunger, and means for giving the plunger a partial rotation after receiving part of a charge of articles, substantially as described.

71. The combination of a depositing plunger carried by a plunger stem splined to reciprocate within a rotary bearing, means for rotating the bearing, means for reciprocating the plunger, and means for delivering articles from the plunger, substantially as described.

72. A depositing plunger having a pivoted support for the articles mounted to swing outwardly, and a packing plate mounted to move upward within the plunger to retract the support and deliver and pack the articles, substantially as described.

73. The combination with a depositing plunger having supports for the articles and a packing plate, of means for retracting the supports for delivering the articles, and means for moving the packing plate downward to pack the articles and for maintaining the packing plate in position to press the articles while the plunger moves upward, substantially as described.

74. The combination with a depositing plunger for depositing cigarettes or similar articles, of a packing plate for packing the articles delivered from the plunger having a transversely convex packing face, and means for maintaining the packing plate in packing position to set the cigarettes, substantially as described.

75. The combination with a depositing plunger, a carrier having a pocket to which cigarettes or similar articles are delivered by the plunger, feeding devices for feeding wrapper sheets between the plunger and the pocket in position to be carried into the pocket and partially folded about the articles, and a packing plate carried by the plunger having a transversely convex packing face, substantially as described.

76. The combination with a carrier having a plurality of pockets, a depositing plunger for delivering articles to the pockets, feeding devices for feeding wrapper sheets between the depositing plunger and the pocket in position to be carried into the pocket and partially folded about the articles, folding devices for completing the folding of the wrapper about the articles to form a package, box presenting means, and transferring means for transferring the packages from the pockets and depositing them in the boxes, substantially as described.

77. The combination with a carrier having a plurality of pockets for receiving articles with wrappers partially folded about the articles, a folder for folding down the forward sides of the wrappers as the pockets are advanced, and a folder reciprocating longitudinally of the direction of movement of the carrier for folding down the rearward sides of the wrappers, and means for raising the reciprocating folder to cause it to clear the upturned sides of the wrappers as it is moved backward, substantially as described.

78. The combination with a rotating carrier having a plurality of radially arranged pockets adapted to receive articles with wrappers partially folded about the articles, a folder having an oscillating movement concentric with the movement of the carrier for folding down the rearward sides of the wrappers, means for raising said folder to cause it to clear the upturned sides of the wrappers as it moves backward, and a folder for folding down the forward sides of the wrappers, substantially as described.

79. The combination of a carrier having a plurality of pockets for receiving articles with wrappers partially folded about the articles, said pockets having walls for maintaining the upturned sides of the wrappers in position and said walls having openings 28 therein, of folders for folding down the sides of the wrappers having folding projections adapted to pass through said openings, substantially as described.

80. The combination with a carrier having a plurality of pockets for receiving articles with wrappers partially folded about the articles, said pockets having walls for maintaining the upturned sides of the wrapper in position and said walls having vertical openings 28 therein, of a horizontally and vertically reciprocating folder having projections adapted to pass through the said openings for folding down the rearward sides of the wrappers, and means for folding down the forward sides of the wrappers, substantially as described.

81. The combination with a carrier having a plurality of pockets for receiving articles with wrappers partially folded about the articles, said pockets having walls for maintaining the upturned sides of the wrapper in position, said walls having openings 28 therein, means for folding down the rearward sides of the wrappers, and a plurality of plates extending into said openings for folding down the forward sides of the wrappers and for maintaining the folded sides of the wrappers in position as the pockets move beneath said plates, substantially as described.

82. The combination with the carrier 25 having pockets 26, of the folding arm 75 mounted concentrically with the carrier, and means for oscillating the arm 75 and for reciprocating it vertically, substantially as described.

83. The combination with a carrier for advancing a package with the wrapper ends unfolded, of folders for folding down the top portions of the extending ends of the wrapper, folders for folding in the side portions of the extending ends of the wrappers, and an actuating member, and connections between the actuating member and said folders whereby when the member moves in one direction the top folders will be actuated and when the member moves in the other direction the top folders will be retracted and the side folders will be actuated, substantially as described.

84. The combination with a carrier for advancing a package with the ends unfolded, of folders for folding down the top portions of the extending ends of the wrapper, folders for folding in the side portions of the extending ends of the wrapper, a movable support for said folders by the movement of which the folders are moved into and out of operative position, an actuating member, and lost motion connections between the folders and the actuating member whereby movement of the actuating member in one position with relation to the support will operate the top folders and movement of the actuating member in another position with relation to the support will actuate the side folders, substantially as described.

85. The combination with a carrier for advancing packages with unfolded ends, of a carrying plunger, end folders carried by the plunger, and an operating plunger for actuating the folders when they have been moved by the carrying plunger into operative position, substantially as described.

86. The combination with a carrier for advancing packages with unfolded ends, of folders for folding the top and side portions of the extending ends of the wrapper, normally held out of the path of the extending ends of the wrapper, means for moving said folders into operative position, means for actuating said folders when in operative position, folders carried by the carrier for folding up the bottom portions of the extending ends of the wrapper, and means for actuating the bottom folders after the top and side portions of the extending ends of the wrapper have been folded, substantially as described.

87. The combination with a carrier for advancing packages with unfolded ends, of folders for folding the top and side portions of the extending ends of the wrapper and to which the packages are presented by the carrier, folders carried by the carrier for folding up the bottom portions of the extending ends of the wrapper, and means for actuating said bottom folders after the top and side portions of the extending ends of the wrapper have been folded, substantially as described.

88. The combination with a carrier for advancing packages with unfolded ends, of folders for folding the top and side portions of the extending ends of the wrapper and to which the packages are presented by the carrier and from which they are advanced by the carrier for delivery therefrom, folders carried by the carrier for folding up the bottom portions of the extending ends of the wrapper, and means for actuating said bottom folders after the top and side portions of the extending ends of the wrapper have been folded and for holding said bottom folders in operative position as the carrier moves forward, substantially as described.

89. The combination with a carrier for advancing a package with unfolded ends, of folders for folding the top and side portions of the extending ends of the wrapper, folders carried by said carrier for folding up the bottom portions of the extending ends of the wrapper, a member for actuating said bottom folders, and means for moving said member in the opposite direction from the carrier to give said folders their folding movement and for then moving said member with the carrier to maintain the folders in folding position, substantially as described.

90. The combination with a carrier having a plurality of pockets adapted to carry packages with unfolded ends, of folders for folding the top and side portions of the extending ends of the wrapper, a pair of folders 130 for each pocket mounted on the carrier and normally held in retracted position, and a wedge cam 132 for actuating the folders 130, substantially as described.

91. The combination with a rotary carrier having a plurality of radially arranged pockets adapted to carry packages with unfolded ends, of folders for folding the top and side portions of the extending ends of the wrapper, a pair of folders 130 for each pocket mounted on the carrier and normally held in retracted position, a wedge cam 132 for actuating the folders 130 mounted to oscillate concentrically with the carrier, and means for operating said cam to give it a movement in the opposite direction from the carrier for giving the folders 130 their folding movement and then to move it with the carrier for maintaining the folders 130 in their upturned position, substantially as described.

92. The combination with an intermittently rotary carrier having a plurality of radially arranged pockets, folding devices for folding a wrapper about the articles in the pockets including a pair of folders 130 for each pocket mounted on the carrier, means for transferring the folded packages from the carrier, a cam 132 for actuating the folders 130 and for maintaining said folders for each pocket in their upturned position as the pocket is moved from the position at which the folding of the wrapper is completed to the position at which the packages are fed from the carrier, and means for retracting said cam when the pocket is in the last mentioned position, substantially as described.

93. The combination with a carrier for advancing packages with unfolded ends, a support, top folders 101 for folding down the top portions of the extending ends of the wrapper pivoted horizontally to the support, pairs of side folders 110 for folding the side portions of the extending ends of the wrapper pivoted to the support with the axis of each pair substantially in the same vertical plane and inclined outwardly and downwardly, means for reciprocating the support to move the folders into operative position from a normal position out of the line of movement of the extending ends of the wrappers, and means for actuating the folders, substantially as described.

94. The combination of a top folder 101, side folders 110, an actuating member, a pin and slot connection between the actuating member and a part connected with the folder 101, the slot being formed to permit continued upward and return movement of the actuating member after the folder has been retracted, and pin and slot connections between the actuating member and parts connected with the side folders 110, the slots of such connections being formed to permit continued downward and return movement of the actuating member after the folders 110 have been retracted, substantially as described.

95. The combination with a support, top folders 101 and side folders 110 carried by the support, means for reciprocating the support to move the folders into operative position, an actuating member, pin and slot connections between the actuating member and parts connected with the folders 101, the slots being formed to permit continued upward and return movement of the actuating member with relation to the support after the folders have been retracted, pin and slot connections between the actuating member and parts connected with the folders 110, the slots of such connections being formed to permit continued downward and return movement of the actuating member with relation to the support after the folders 110 have been retracted, and means for reciprocating the actuating member to cause it to move relatively to the support to produce the desired movements of the folders, substantially as described.

96. The combination with a transferring carrier, of a series of intermittently moving pockets, a series of intermittently moving box holders, and means for operating the carrier to carry packages from said pockets and deliver them to boxes in said holders, substantially as described.

97. The combination with an intermittently moving carrier having a plurality of pockets, of a box presenting mechanism, and a horizontally and vertically reciprocating carrying carrier for transferring articles from said pockets and delivering them to the boxes, substantially as described.

98. The combination with a carrier having a plurality of pockets for receiving articles with wrappers partially folded about the articles, of means for completing the folding of the wrappers, a transferring carrier for seizing the wrapped articles, means for moving the carrier horizontally to carry the articles from the pockets, and means for raising the transferring carrier to cause it to clear the walls of the pockets on its return movement, substantially as described.

99. The combination with a carrier having a plurality of pockets for receiving articles with the wrappers partially folded about the articles, of box presenting mechanism, and a transferring carrier for seizing articles in the pockets and having a horizontal movement for carrying the articles from the pockets and a downward reciprocation for depositing the articles in the boxes, substantially as described.

100. The combination with means for presenting articles, of a horizontally reciprocating transferring carrier having grippers for seizing the articles, and means for moving the carrier downward and the grippers inward to grasp the article, and for moving the grippers to release the article after the carrier has made its transferring movement, substantially as described.

101. The combination of a horizontally reciprocating transferring carrier having grippers for seizing the articles to be transferred and having a plate for engaging the top of the article, a table over which the articles are moved by the carrier, and means for actuating the grippers to seize the article and for moving the pressing plate down on the article and for moving the grippers to release the article after the carrier has made its transferring movement, substantially as described.

102. The combination of a transferring carrier having grippers for seizing the articles to be transferred, a horizontally moving carriage by which the carrier is carried by means of a plunger stem mounted to reciprocate vertically in the carriage, a second plunger stem mounted on the carriage and carrying a plunger head by which the grippers are actuated, means for reciprocating the carriage, and means for reciprocating the first of said plunger stems for raising and lowering the carriage and for reciprocating the second of said plunger stems for actuating the grippers, substantially as described.

103. The combination of a reciprocating carriage, a member mounted to reciprocate on said carriage, grippers carried by said member, a second member mounted to reciprocate on the carriage for operating the grippers carried by the first said member, a rock shaft, a pinion splined on said shaft and held between guides on the carriage in gear with a rack on the first said member, a second rock shaft, a pinion splined on said shaft and held between guides on the carriage in gear with a rack on the second said member, means for reciprocating the carriage, and means for rocking said shafts to reciprocate the members, substantially as described.

104. The combination of parallel rock shafts, a carriage mounted to slide on said shafts, a plunger carried by said carriage, grippers carried by said plunger, a pinion splined on one of said rock shafts and held between guides on the carriage in gear with a rack on said plunger, a second plunger mounted on the carriage for actuating the grippers carried by the first plunger, a pinion splined on the other of said rock shafts and held between guides on the carriage in gear with a rack on said last mentioned plunger, means for reciprocating the carriage, and means for rocking the said shafts for reciprocating said plunger, substantially as described.

105. The combination of a plunger-head 175, gripping plates 177 carried thereby, a plunger stem by which said plunger is carried, a second plunger stem, means for moving the gripper plates 178 toward and away from each other in accordance with the movement of the second plunger stem with relation to the first plunger stem, and means for reciprocating the plunger-head transversely of said plunger stems, substantially as described.

106. The combination with a plunger-head 175, gripping plates 177 carried thereby, a plunger stem by which said plunger is carried, a second plunger stem, means for moving the gripper plates 178 toward and away from each other in accordance with the movement of the second plunger stem with relation to the first plunger stem, pressing plate 183 carried by the second plunger stem, and means for reciprocating the plunger-head transversely of said plunger stems, substantially as described.

107. The combination with an intermittently moving carrier having a plurality of box holders, a forming die for pressing blanks in said holders to partially form boxes, and a blank feeding mechanism for positioning blanks beneath said die comprising a blank holder, a reciprocating plate forming the bottom of the holder and having a shoulder for advancing the blanks successively from the holder and a second shoulder for advancing the blanks into position beneath the plunger, and a detent for preventing the blanks fed from the holder from returning with the reciprocating plate on its return movement, substantially as described.

108. The combination with a blank holder, of a pusher for advancing the bottom blank in the holder, a second pusher for further advancing the blank which has been advanced by the first pusher, and means for preventing return movement of the blank after it has been advanced by the first pusher, substantially as described.

109. The combination with a holder 155, of a plate 156 forming the bottom of the holder, means for reciprocating the plate 156, shoulders 162 and 163 on said plate placed a distance apart less than the reciprocations of the plate, detaining fingers 164, and a guide 165, substantially as described.

110. The combination of a holder 155, a reciprocating slide having feeding shoulders 162 and 163, means for reciprocating the slide through a distance greater than the distance between said shoulders, and a detaining finger 164, substantially as described.

111. The combination with a blank holder for holding a pile of blanks having side notches, means for advancing the bottom blank from the holder, and projections for extending into the notches of the blanks in the holder having forwardly projecting extensions beneath which the edges of the bottom blank pass as it is fed from the holder, substantially as described.

112. The swinging folder 101 having two folding faces at an angle to each other slightly less than a right angle, and means for giving the folder a folding movement to bring one folding face into a position past the vertical and the other into a horizontal position, substantially as described.

113. In a machine for packaging materials, the combination of a form-carrier, goods delivery mechanism, wrapper-presenting mechanism, means for folding the wrapper about the goods, a box-carrier, means for placing box-slides therein, means for transferring the wrapped material to the box-slide, means for closing the slide, and means for placing the slide thus closed in a shuck.

114. In an organized machine for packaging materials, the combination of a form-carrier, mechanism working in conjunction therewith to completely envelop or wrap the material to form a package in said carrier, a box-carrier, means for placing box-slides in said carrier, means for transferring the formed package to a box-slide, means for closing the slide, and means for removing the slide and its contents from the carrier and placing the same in a shuck.

115. In an organized machine for packaging cigarettes, the combination of a form-carrier, means for traversing the same step by step, means for placing a wrapper over each form as it reaches a predetermined point in its course of travel, means for placing a predetermined number of cigarettes upon the wrapper and forcing the wrapper and cigarettes into one of the forms, means for folding the wrapper about the cigarettes, a box-carrier, means for placing box-slides therein, means for transferring the cigarette package to a slide, means for folding said slide, and means for moving the slide and its contents into an opened shuck.

116. In an organized machine for packaging cigarettes, the combination of a form-carrier, means for traversing the same step by step, a supply hopper, means for placing a wrapper beneath the hopper and over the form immediately below the same, means for withdrawing a predetermined number of cigarettes from the hopper and moving the same and the wrapper into the form, means for completely folding the wrapper about the cigarettes, a box-carrier, means for placing box-slides therein, means for transferring the wrapped cigarettes to a slide, means for placing a series of mouth-pieces in the slide, means for closing the slide, and means for placing the slide and its contents in an opened shuck.

117. In a machine for packaging cigarettes, the combination of a form-carrier, means for imparting a step by step motion thereto, a series of forms mounted upon the carrier, each of said forms comprising an open-ended receptacle provided upon opposite sides with upstanding separated fingers, a hopper for the cigarettes, a plunger serving to remove cigarettes from the discharge mouth of the hopper and to carry the same with a previously-positioned wrapper down into a form immediately below the plunger, a folder for one of the upstanding edges of the wrapper in the form which has been advanced from beneath the plunger, said folder comprising a series of fingers which move inwardly between the upstanding fingers of the form and serve to carry the wrapper inwardly and down upon the cigarettes held in the form, and means for imparting motion to said folder.

118. In a machine for packaging cigarettes, the combination of a form-carrier, a series of forms mounted thereon, each of said forms comprising an open-ended receptacle with a series of upstanding fingers upon opposite sides, means for placing a series of cigarettes and a previously-positioned wrapper within said form, a folder for one of the upstanding edges of the wrapper, said folder comprising a series of fingers mounted upon a movable support, means for imparting an upward and downward movement to said support, a series of fixed folders standing in line with the upper face of the package and tending, as the form-carrier is advanced, to fold the remaining upstanding edge of the wrapper down upon the previously-folded portion thereof, and means for tucking and folding in the ends of the wrapper.

119. In a machine for packaging cigarettes, the combination of means for wrapping a predetermined number of cigarettes, a box-carrier, a magazine located to one side of the box-carrier for holding a series of box-slides, means for advancing the box-slides one at a time outward and over the box-carrier, means for placing the slides in the carrier in a partially-folded condition, means for directing the previously wrapped cigarettes into said slides, means for placing a series of mouth-pieces in each slide alongside the packaged cigarettes, means for folding each slide about its contents, and means for moving the slide and its contents from the box-carrier into a previously-opened shuck.

In testimony whereof, I have hereunto set my hand, in the presence of two subscribing witnesses.

BENJ. W. TUCKER.

Witnesses:
L. R. COMPTON,
T. F. KEHOE.